United States Patent
Takami

(10) Patent No.: US 10,025,670 B2
(45) Date of Patent: Jul. 17, 2018

(54) INFORMATION PROCESSING APPARATUS, MEMORY DUMP METHOD, AND STORAGE MEDIUM

(71) Applicant: FUJITSU LIMITED, Kawasaki-shi, Kanagawa (JP)

(72) Inventor: Hiroyuki Takami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 15/003,892

(22) Filed: Jan. 22, 2016

(65) Prior Publication Data

US 2016/0139995 A1  May 19, 2016

Related U.S. Application Data

(63) Continuation of application No. PCT/JP2013/070698, filed on Jul. 31, 2013.

(51) Int. Cl.
G06F 11/00 (2006.01)
G06F 11/14 (2006.01)
G06F 11/07 (2006.01)
G06F 3/06 (2006.01)

(52) U.S. Cl.
CPC ........ *G06F 11/1441* (2013.01); *G06F 3/0619* (2013.01); *G06F 3/0647* (2013.01); *G06F 3/0688* (2013.01); *G06F 11/0706* (2013.01); *G06F 11/0778* (2013.01); *G06F 2201/805* (2013.01)

(58) Field of Classification Search
CPC .................................................. G06F 11/1441
See application file for complete search history.

(56) References Cited

U.S. PATENT DOCUMENTS

| 5,111,384 A * | 5/1992 | Aslanian | G06F 11/2257 |
| | | | 706/45 |
| 7,831,857 B2 * | 11/2010 | Muppirala | G06F 11/0778 |
| | | | 714/2 |
| 9,015,535 B2 | 4/2015 | Kondou et al. | |

(Continued)

FOREIGN PATENT DOCUMENTS

| JP | 3-257641 A | 11/1991 |
| JP | 4-182748 | 6/1992 |

(Continued)

OTHER PUBLICATIONS

International Search Report and Written Opinion of the International Searching Authority (Form PCT/ISA/210, Form PCT/ISA/237), mailed in connection with PCT/JP2013/070698 dated Oct. 29, 2013 (8 pages).

(Continued)

*Primary Examiner* — Christopher S McCarthy
(74) *Attorney, Agent, or Firm* — Fujitsu Patent Center

(57) ABSTRACT

An information processing apparatus includes a processor that executes an operating system, a nonvolatile main memory device to which the processor is directly accessible and that has a controller, and an external storage device to which the processor is not directly accessible. When the processor detects an error of the operating system, the processor resets devices other than the nonvolatile main memory device and restarts the operating system, and the controller writes data of the nonvolatile main memory device to the external storage device.

10 Claims, 21 Drawing Sheets

(56) References Cited

U.S. PATENT DOCUMENTS

| | | | |
|---|---|---|---|
| 9,665,419 B2* | 5/2017 | Desai | G06F 11/0778 |
| 2002/0029359 A1 | 3/2002 | Kiyoi et al. | |
| 2003/0120968 A1 | 6/2003 | Andress et al. | |
| 2005/0204107 A1 | 9/2005 | Narayan et al. | |
| 2009/0216967 A1 | 8/2009 | Sugawara | |
| 2010/0016205 A1 | 6/2010 | Schwab | |
| 2010/0162052 A1 | 6/2010 | Shimogawa | |
| 2011/0004780 A1 | 1/2011 | Hirata | |
| 2012/0151278 A1* | 6/2012 | Tsantilis | G06F 11/366 |
| | | | 714/48 |
| 2016/0299809 A1* | 10/2016 | McCoy | G06F 11/079 |
| 2017/0192831 A1* | 7/2017 | Abrams | G06F 11/079 |

FOREIGN PATENT DOCUMENTS

| | | |
|---|---|---|
| JP | 5-134906 | 6/1993 |
| JP | 9-259014 | 10/1997 |
| JP | 10-333944 | 12/1998 |
| JP | 2004-102395 | 4/2004 |
| JP | 2004-362426 | 12/2004 |
| JP | 2008-242999 | 10/2008 |
| JP | 2009-205254 | 9/2009 |
| JP | 2011-257987 | 12/2011 |
| WO | 2012/090290 A1 | 7/2012 |

OTHER PUBLICATIONS

Japanese Office Action dated Aug. 16, 2016 for corresponding Japanese Application No. 2015-529269, with Partial English Translations, 5 pages.

Extended European Search Report dated Jun. 16, 2016 for corresponding European Patent Application No. 13890813.2, 6 pages.

* cited by examiner

| PAGE NUMBER | FLAG | |
|---|---|---|
| 0 | FREE SPACE | 203 |
| 1 | USED AREA (Dirty) | |
| 2 | USED AREA (Sync) | |
| 3 | UNDUMPED | |
| 4 | UNDUMPED (1) | |
| 5 | UNDUMPED (2) | |
| ... | ... | |
| 15 | Reserved | |

FIG. 4

| |
|---|
| KIND OF MAIN MEMORY MODULE: NONVOLATILE |
| CAPACITY OF MAIN MEMORY MODULE : 100GB |
| THE PRESENCE OR ABSENCE OF ECC: PRESENT |
| TEMPERATURE SENSOR VALUE : 35°C |
| ... |
| SPARE AREA |
| BG DUMP FLAG[0-2]=0 |
| DUMP DESTINATION EXTERNAL STORAGE DEVICE Ctrl=0, Device=2 |
| FREE AREA: UNUSED |
| ... |

F I G. 5

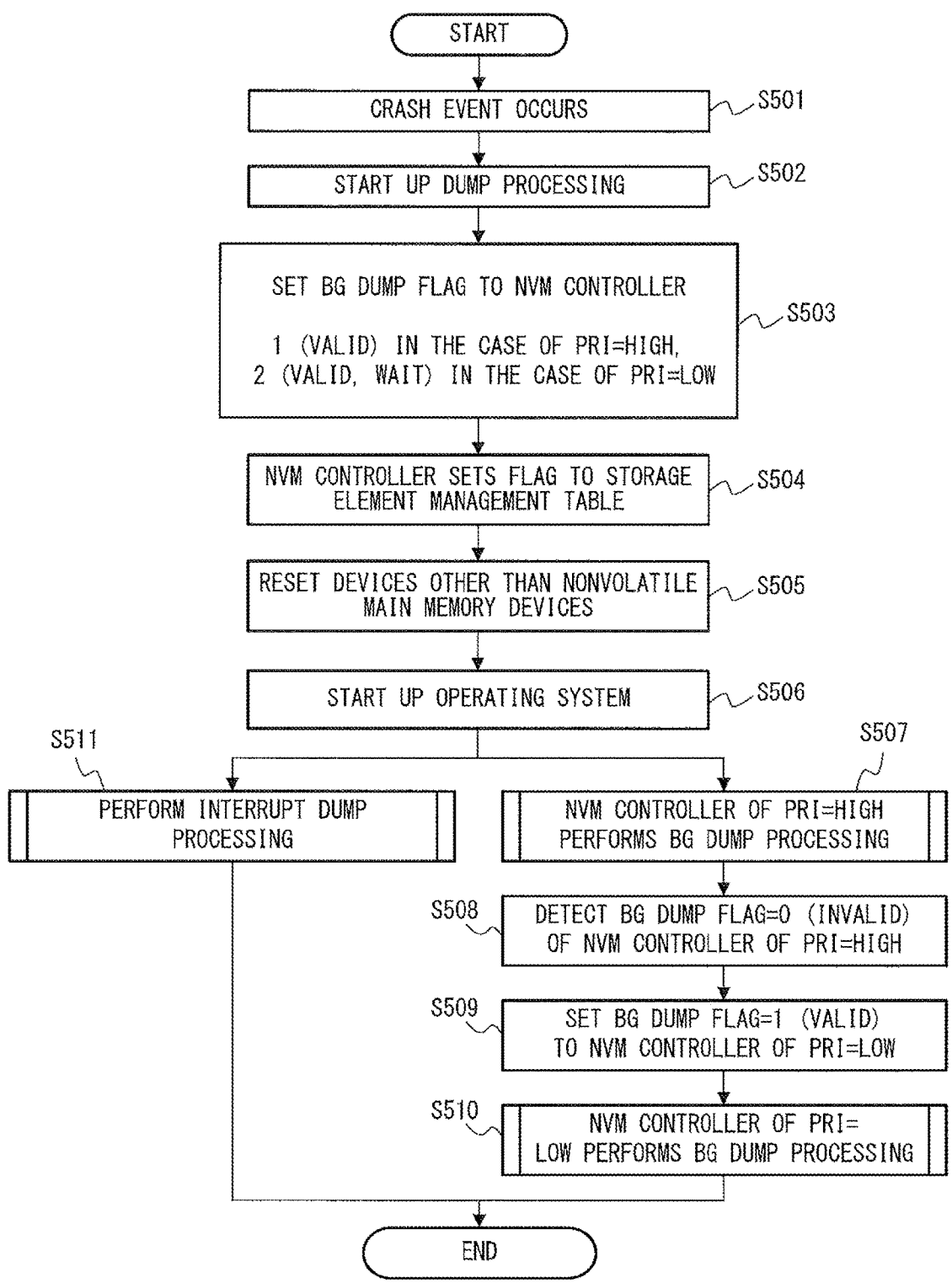
F I G. 6

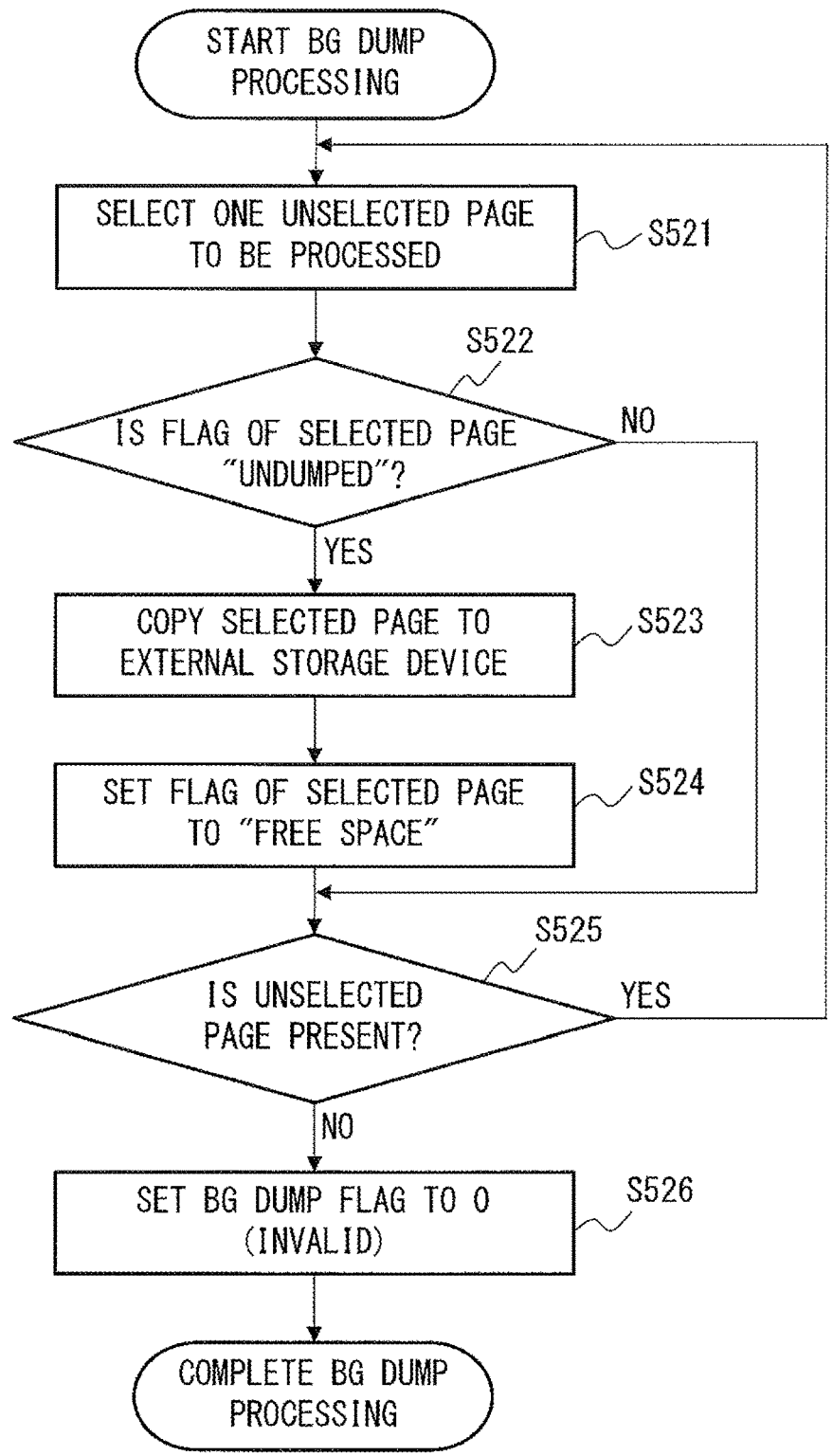
F I G. 7

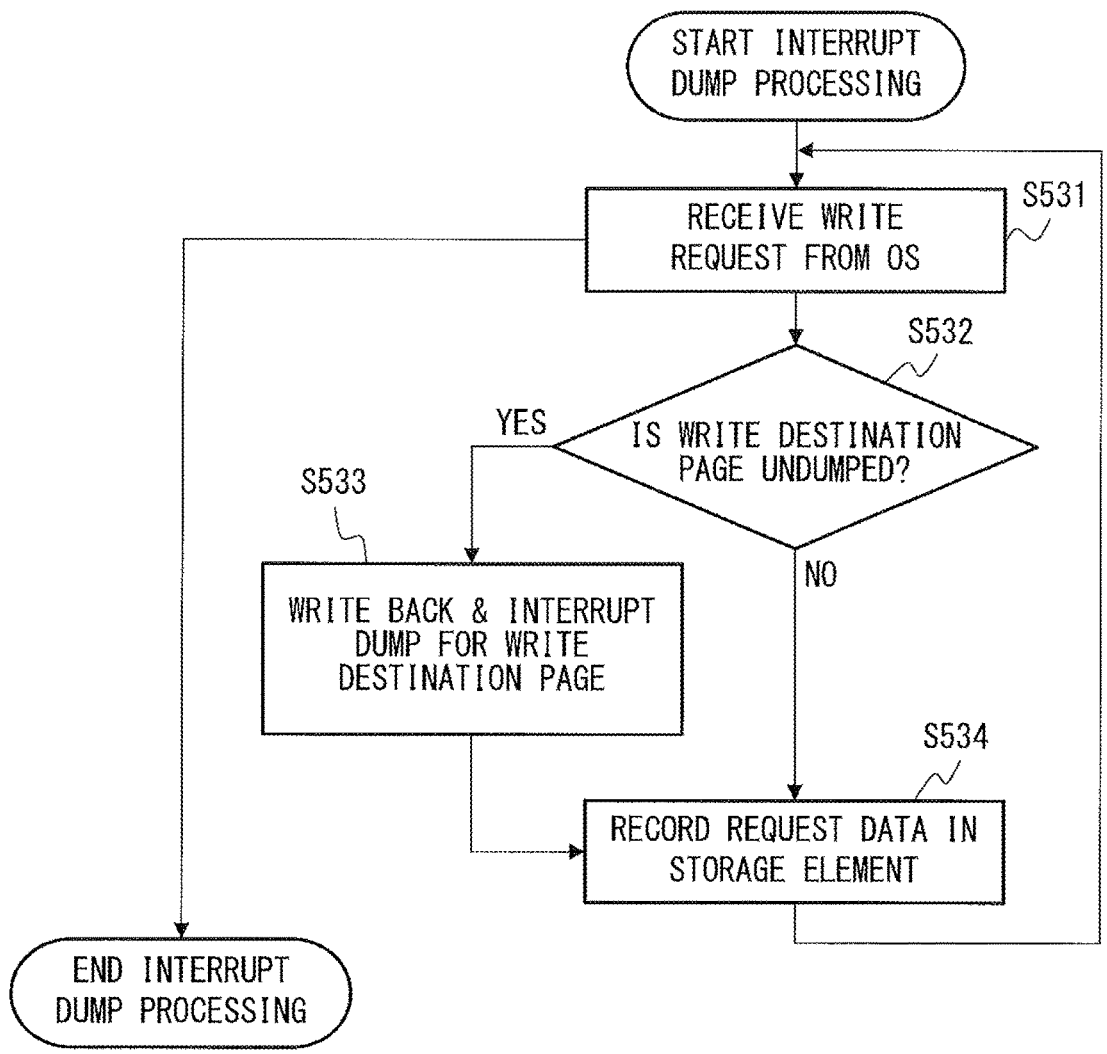
F I G. 8

| PHYSICAL MEMORY ADDRESS RANGE VIEWED FROM OUTSIDE | USE STORAGE ELEMENT POSITION | PAGE NUMBER | FLAG |
|---|---|---|---|
| 0x0100 0000 ~0x0100FFFF | 0xABCD | 3 | USED AREA (Dirty) |
| 0x0101 0000 ~0x0101 FFFF | 0x1254 | 20 | UNDUMPED |
| 0x0102 0000 ~0x0102 FFFF | 0xC05A | 35 | UNDUMPED |
| ... | ... | ... | ... |
| UNASSIGNED | 0x57B9 | | |
| ... | ... | ... | ... |

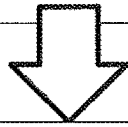

| PHYSICAL MEMORY ADDRESS RANGE VIEWED FROM OUTSIDE | USE STORAGE ELEMENT POSITION | PAGE NUMBER | FLAG |
|---|---|---|---|
| 0x0100 0000 ~0x0100FFFF | 0xABCD | 3 | USED AREA (Dirty) |
| 0x0101 0000 ~0x0101 FFFF | 0x57B9 | 20 | USED AREA (Dirty) |
| 0x0102 0000 ~0x0102 FFFF | 0xC05A | 35 | UNDUMPED |
| ... | ... | ... | ... |
| 0x0101 0000 ~0x0101 FFFF (INVALID) | 0x1254 | 20 | UNDUMPED |
| ... | ... | ... | ... |

FIG. 15

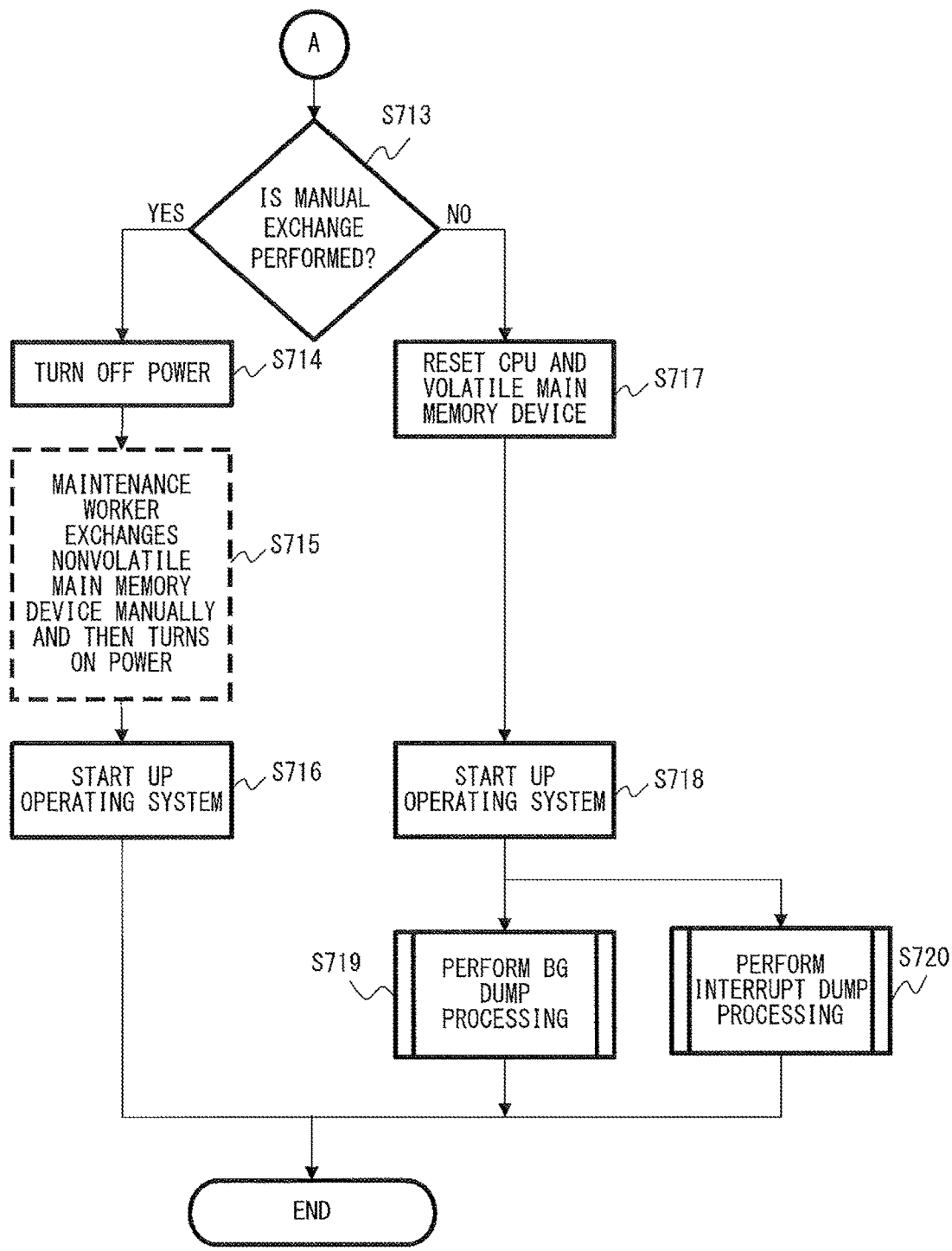
F I G. 18B

INFORMATION PROCESSING APPARATUS, MEMORY DUMP METHOD, AND STORAGE MEDIUM

CROSS-REFERENCE TO RELATED APPLICATION

This application is a continuation application of International Application PCT/JP2013/070698 filed on Jul. 31, 2013 and designated the U.S., the entire contents of which are incorporated herein by reference.

FIELD

The embodiments discussed herein are related to an information processing apparatus, a memory dump method, and a memory dump program.

BACKGROUND

In recent years, a UNIX (registered trademark) server and an IA server have been introduced to mission-critical systems, and the high availability of the UNIX (registered trademark) server and the IA server has been emphasized. In general, when a fatal error (crash event) occurs in a system, the system is stopped in an emergency and a memory dump is stored in a disk to examine a cause of the error.

While the system is stopped, the system is not used, and therefore it is an important requirement that the system be restarted rapidly and that an operations stoppage time be shortened.

However, in recent years, a server has appeared in which a capacity of a packaged memory is on the order of a terabyte (TB). In such a system, a lot of time is required to perform a memory dump and it is difficult to restart the system rapidly.

CITATION LIST

Patent Documents

[Patent Document 1] Japanese Laid-open Patent Publication No. 2004-102395
[Patent Document 2] Japanese Laid-open Patent Publication No. 04-182748
[Patent Document 3] Japanese Laid-open Patent Publication No. 10-333944

SUMMARY

An information processing apparatus of embodiments includes a processor, a nonvolatile main memory device, and an external storage device.

The processor executes an operating system.

The processor is directly accessible to the nonvolatile main memory device and the nonvolatile main memory device has a controller.

The processor is not directly accessible to the external storage device.

When the processor detects an error in the operating system, the processor resets devices other than the nonvolatile main memory device and restarts the operating system.

The controller writes data of the nonvolatile main memory device to the external storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a storage element management table.
FIG. 5 illustrates information recorded in an EEPROM.
FIG. 6 is a flowchart of memory dump processing according to the first embodiment.
FIG. 7 is a detailed flowchart of BG dump processing according to the first embodiment.
FIG. 8 is a detailed flowchart of interrupt dump processing according to the first embodiment.
FIG. 15 illustrates the extension storage element management table before an assignment change and after the assignment change.
FIG. 18B is a flowchart of the memory dump processing according to the fourth embodiment.

DESCRIPTION OF EMBODIMENTS

Hereinafter, embodiments will be described with reference to the accompanying drawings.

Figure 1:
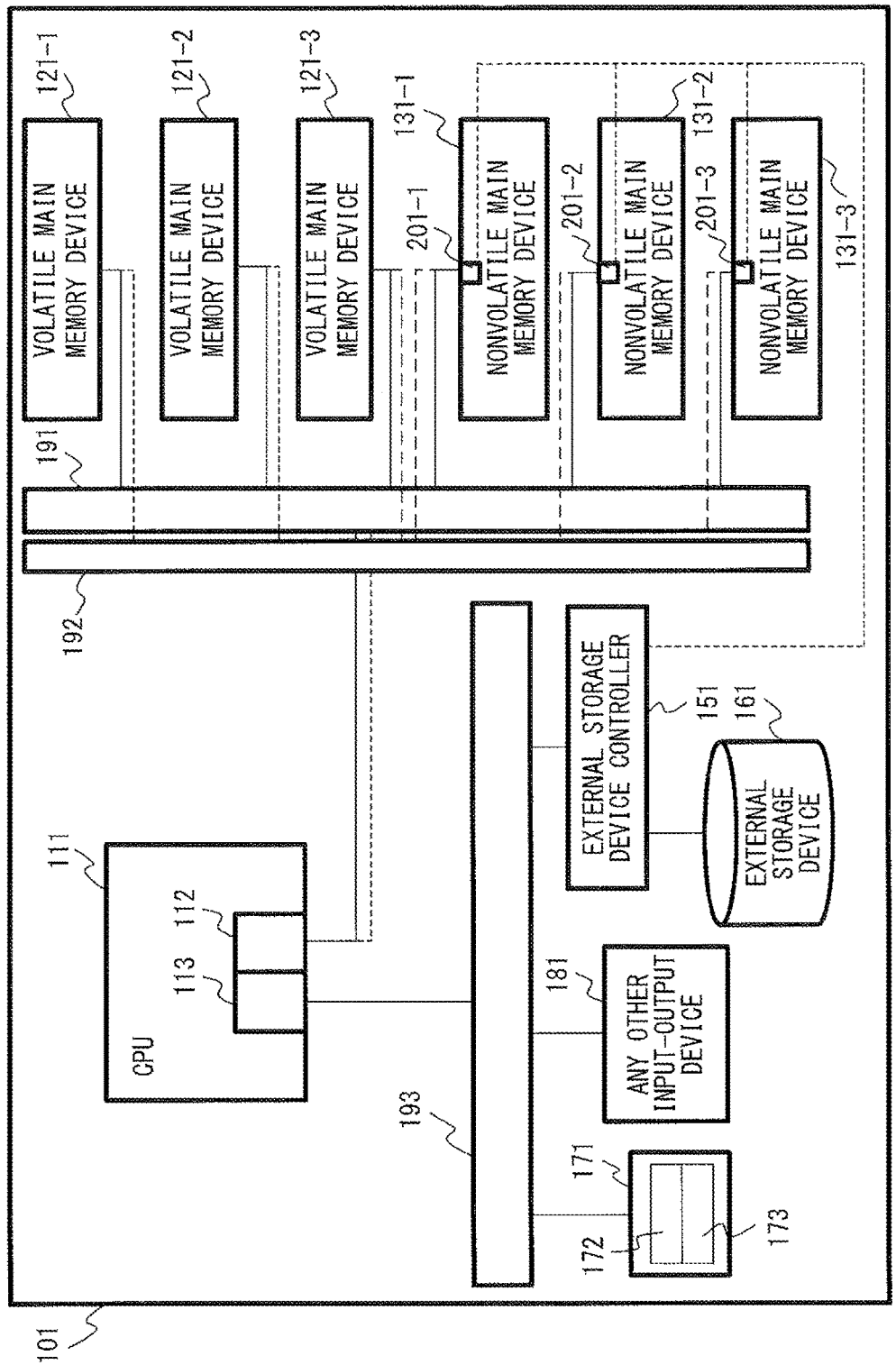
FIG. 1 is a block diagram of an information processing apparatus according to a first embodiment.

FIG. 1 is a block diagram of an information processing apparatus according to a first embodiment.

The information processing apparatus 101 is a computer such as a personal computer (PC) or a server.

The information processing apparatus 101 includes a Central Processing Unit (CPU) 111, volatile main memory devices 121-$i$ (i=1 to 3), nonvolatile main memory devices 131-$i$, an external storage device controller 151, an external storage device 161, a Basic Input-Output System (BIOS) storage area 171, and any other input-output device 181.

The CPU 111 is a processor (processing unit) that executes various processing.

The CPU 111 reads out a BIOS 172 stored in the BIOS storage area 171 and executes the BIOS 172. Further, the CPU 111 reads out and executes programs stored in the volatile main memory devices 121 or the nonvolatile main memory devices 131.

In the information processing apparatus 101, an operating system (OS) is installed and the CPU 111 reads out the OS from the external storage device 161 to the volatile main memory devices 121 and/or the nonvolatile main memory devices 141, and executes the OS.

The CPU 111 has a memory controller 112 and an I/O controller 113.

The memory controller 112 performs control of reading and writing with respect to the volatile main memory devices 121 and the nonvolatile main memory devices 131. The memory controller 112 is connected to the volatile main memory devices 121 and the nonvolatile main memory devices 131 via a memory bus 191. Data of the volatile main memory devices 121 and that of the nonvolatile main memory devices 131 is transmitted via a memory bus 192.

Further, the memory controller 112 is connected to the volatile main memory devices 121 and the nonvolatile main memory devices 131 via the Inter-Integrated Circuit ($I^2C$) bus 192. The memory controller 112 doubles as a master controller of an $I^2C$.

The I/O controller 113 performs control of the input-output device. The I/O controller 113 is connected to the BIOS storage area 171, the external storage device controller 151, and any other input-output device 181 via a Peripheral Component Interconnect (PCI) bus 193.

The volatile main memory devices 121 are storage devices that store data using volatile storage elements. The volatile main memory devices 121 are, for example, a Dynamic Random Access Memory (DRAM).

The volatile main memory devices 121 are directly accessible from the CPU 111.

The nonvolatile main memory devices 131 are storage devices that store data using nonvolatile storage elements. The nonvolatile main memory devices 131 are, for example, a NAND type flash memory, a Magnetoresistive Random Access Memory (MRAM), or the like.

The nonvolatile main memory devices 131 can hold data even if power is not supplied.

The nonvolatile main memory devices 131 are directly accessible from the CPU 111.

The external storage device controller 151 controls the external storage device 161. The external storage device controller 151 is connected to the I/O controller 113, the external storage device 161, and a NonVolatile Memory (NVM) controller 201.

The external storage device 161 is a nonvolatile storage device that stores data.

The external storage device 161 is not directly accessible from the CPU 111. Therefore, when the CPU 111 reads out data of the external storage device 161, the data is transferred to the volatile main memory devices 121 or the nonvolatile main memory devices 131, and is read out from the volatile main memory devices 121 or the nonvolatile main memory devices 131.

The external storage device 161 is, for example, a hard disk drive, a Solid State Drive (SSD), a magnetic tape device, or the like. The external storage device 161 has a slower access rate than the volatile main memory devices 121 and the nonvolatile main memory devices 131.

The external storage device 161 is also called an auxiliary storage device or a secondary storage device.

The BIOS storage area 171 stores BIOS Flash Firmware (hereinafter, referred to as a BIOS) 172 and BIOS setting information 173. The BIOS storage area 171 is, for example, a nonvolatile memory.

The BIOS 172 is a program for executing initialization of hardware, actuation of a boot loader, or the like. Further, the BIOS 172 performs dump processing, setting of the NVM controller, or the like.

The BIOS 172 is, for example, a Unified Extensible Firmware Interface (UEFI), extended firmware, or the like.

The BIOS 172 is read out and executed by the CPU 111.

The BIOS setting information 173 is information in which setting values used at the time of memory dump processing, characteristics of main memory devices (the volatile main memory devices 121 and the nonvolatile main memory devices 131) mounted on a memory slot, or the like are described.

Details of the BIOS setting information 173 will be described later.

The any other input-output device 181 is a device that performs input and/or output of data. The any other input-output device 181 is, for example, a Universal Serial Bus (USB) device, a Peripheral Component Interconnect (PCI) card, or the like.

Figure 2:
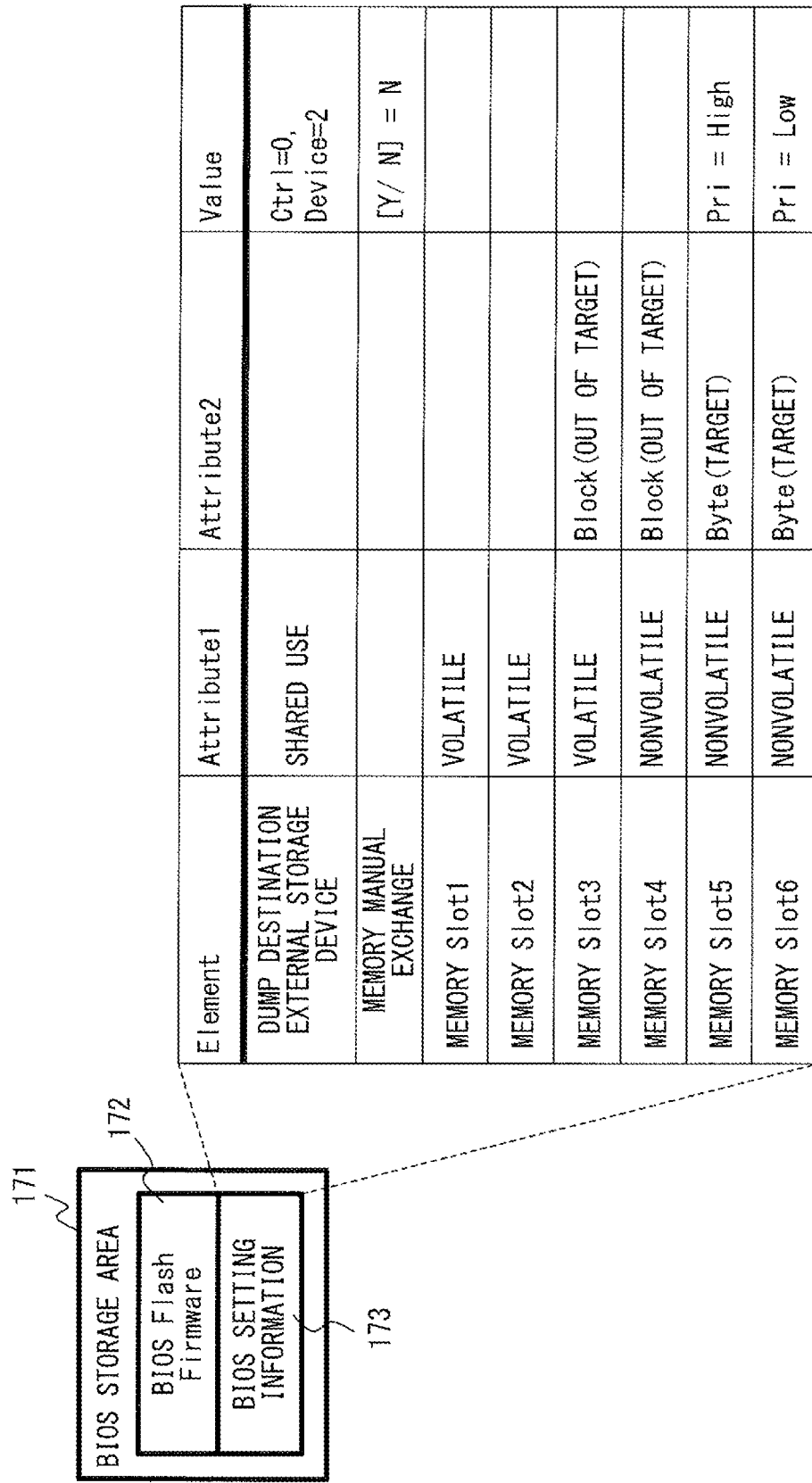
FIG. 2 illustrates an example of BIOS setting information.

FIG. 2 illustrates an example of the BIOS setting information.

In the BIOS setting information 173, an Element, an Attribute 1, an Attribute 2, and a Value are associated with each other and are described.

The Element indicates devices of targets or setting items. In FIG. 2, as the Element, a dump destination external storage device, a memory manual exchange, and memory slots 1 to 6 are described.

The Attribute 1 and the Attribute 2 indicate characteristics of devices. In FIG. 2, the Attribute 1 of the dump destination external storage device is described as "shared use". This indicates that the external storage device is set as a dump destination of a plurality of main memory devices.

Further, in FIG. 2, the attribute 1 of the memory slots 1 to 3 is described as "volatile", and the attribute 1 of the memory slots 4 to 6 is described as "nonvolatile". This indicates that the main memory devices mounted on the memory slots 1 to 3 are volatile and the main memory devices mounted on the memory slots 4 to 6 are nonvolatile.

In FIG. 2, the Attribute 2 of the memory slot 4 is described as "Block (out of the target)" and the Attribute 2 of the memory slots 5 and 6 is described as "Byte (the target)". This indicates that a block access is performed with respect to the main memory device mounted on the memory slot 4, and the memory slot 4 is not a dump target, and indicates that a byte access is performed with respect to the main memory devices mounted on the memory slots 5 and 6, and the memory slots 5 and 6 are the dump target.

Hereinafter, there are two kinds of methods for accessing the nonvolatile main memory devices 131.

(1) Block access: seems to be a block storage device from the OS.
(2) Byte access: seems to be a physical memory space from the OS.

The value is a set value.

In FIG. 2, N is recorded as a value of the memory manual exchange. This indicates that the manual exchange of the nonvolatile main memory devices 131 is not performed. On the other hand, when Y is recorded, this indicates that the manual exchange of the nonvolatile main memory device 131 is performed. In addition, the "memory manual exchange" is used in a fourth embodiment to be described hereinafter.

In FIG. 2, Ctrl=0 and Device=2 are recorded as values of the dump destination external storage device. Ctrl=0 and Device=2 are information for identifying the dump destination external storage device 161.

Further, in FIG. 2, "Pri=High" is recorded as a value of the memory slot 5, and "Pri=Low" is recorded as a value of the memory slot 6. "Pri" indicates priority, and "Pri=High" indicates that the priority of the main memory device mounted on the memory slot 5 is High, and "Pri=Low" indicates that the priority of the main memory device mounted on the memory slot 6 is Low.

Figure 3:
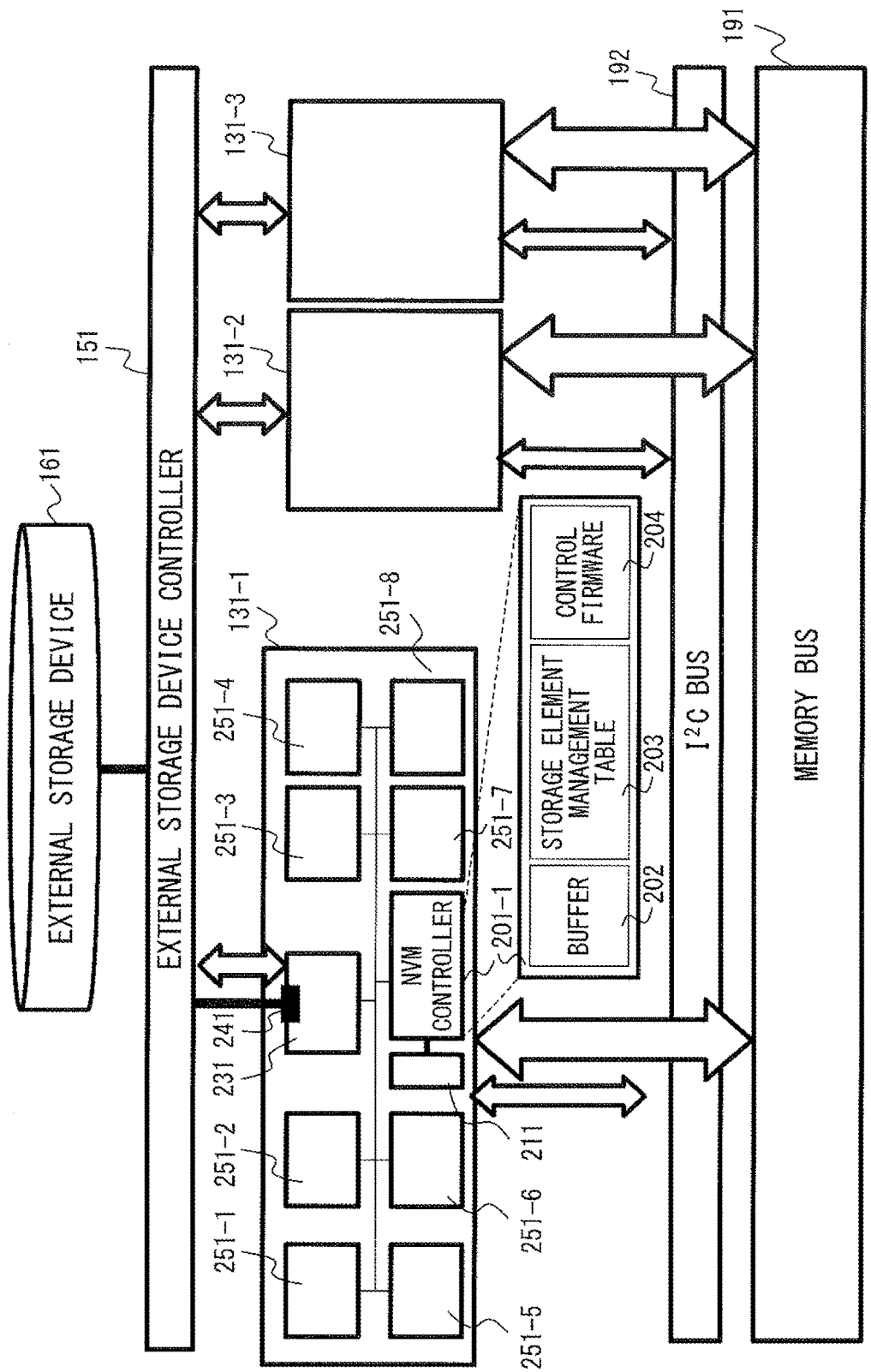
FIG. 3 illustrates a configuration and a connection bus of a nonvolatile main memory device according to the first embodiment.

FIG. 3 illustrates a configuration and a connection bus of the nonvolatile main memory devices according to the first embodiment.

A nonvolatile main memory device 131-1 includes an NVM controller 201-1, Electrically Erasable Programmable Read-Only Memory (EEPROM) 211, an external storage device controller 231, a connector 241, and storage elements 251-$k$ ($k$=1 to 8).

The NVM controller 201-1 has a buffer 202, a storage element management table 203, and control firmware 204.

Independently of operations of the OS, the NVM controller 201-1 actively copies data to be dumped to the external storage device 161. In the same manner as in the access from the OS, in the copy, a minimum access unit is a page. Further, a protocol with the external storage device 161 is within a range of a data length capable of being transmitted by a single transfer command and a plurality of pages are collectively transmitted, thereby realizing efficiency.

The buffer 202 is a storage device that temporarily stores data written to the storage elements 251 or data read out from the storage elements 251.

The storage element management table 203 is a table in which a state of each page of the nonvolatile main memory device 131-1 is described.

Details of the storage element management table 203 will be described later.

In the information processing apparatus 101 of the embodiment, the OS is assumed to divide a main memory area using a virtual storage system into units of a structure called a page and a "page table" is assumed to be present as a configuration for managing the structures. One page table of the OS is held in the whole memory space and is stored using a part of the main memory area, and therefore is not held in each main memory device. On the other hand, apart from the page table managed by the OS, the NVM controller 201 of individual nonvolatile main memory device 131 is assumed to hold a unique page table for a dump management. Further, a size and a starting position of each page are assumed to coincide with those managed by the OS.

The control firmware 204 is a program for performing Background (BG) dump routine processing or the like to be hereinafter described. The control firmware 204 is executed by the NVM controller 201-1.

The configurations of the nonvolatile main memory devices 131-2 and 131-3 are the same as that of the nonvolatile main memory device 131-1, and therefore descriptions will be omitted.

The EEPROM 211 stores information such as characteristics of the nonvolatile main memory device 131-1 or setting of the memory dump processing. Further, details of the information stored in the EEPROM 211 will be described later.

The external storage device controller 231 is connected to the external storage device controller 151 via the connector 241. Regardless of a dump use, this connection can be diverted to a use in which a backup prepared for a failure of the nonvolatile main memory device is realized without imposing a load on the OS, or the like. The external storage device controller 231 transmits and receives data to and from the external storage device controller 151. Communication is performed between the external storage device controller 231 and the external storage device controller 151, and thereby an influence is not exerted on the PCI bus 193 or the I/O controller 113, which includes a Direct Memory Access (DMA) controller.

A communication protocol with the external storage device 161 may be an arbitrary protocol such as a Small Computer System Interface (SCSI). Not only is a function in which the communication protocol is simply exchanged provided on the external storage device controllers 151 and 231, but a level function in which a writing position on the block or the file system can be understood is also provided on the external storage device controllers 151 and 231.

The storage elements 251 are elements that store data.

FIG. 4 illustrates an example of the storage element management table.

A page number and a flag are associated with each other and recorded in the storage element management table 203.

The page number is a number that is assigned to a page. Further, in the following descriptions, a page of a page number n may be described as a page n.

The flag is information for indicating a state of a page. As the flag, a free space, an used area (Dirty), an used area (Sync), undumped, or reserved is recorded.

The free space indicates a free space in which data is not recorded.

In the used area (Dirty), data is written and the data is not copied to the external storage device 161, that is, the used area (Dirty) indicates that the used area is undumped.

In the used area (Sync), data is written and the data is previously copied to the external storage device 161, that is, the used area (Sync) indicates that the used area was previously dumped.

Undumped indicates that the used area has not been dumped. Further, figures added to the end of undumped, such as undumped (1) and undumped (2), indicate a generation of the dump. Also, in the case in which a crash event occurs again during BG dump processing, the dump is enabled again. In this case, in order that the remainder of previous dumped data may be separated from this dumped data, a process is used in which all of previously-used pages are set to be "undumped" in the initial stage in which the NVM controller 201 performs the BG dump processing. In the case in which a flag of a page is found in which "undumped" is already set, "undumped" is written to "undumped" (1), and thereby the separation is enabled. In this case, the NVM controller 201 performs a process in which a previous file name of the dump destination and this file name of the dump destination can be separated from each other, or the like. In last-but-one undumped data, similarly, "undumped (2)" is obtained by incrementing "undumped" (1), and thereby a management of a plurality of generations is also enabled. The manner in which unassigned numbers are present in packaging of the flag reaches the upper limit of the generations. For example, a flag is managed by 4 bits (16 values), and when 4 values is previously assigned as an existing flag, a maximum of 12 generations can be additionally managed.

Reserved indicates that an area is an unused (namely, an address viewed from the outside is not assigned) spare area.

FIG. 5 illustrates information recorded in the EEPROM.

In the EEPROM 211, a kind of main memory module, a capacity of the main memory module, the presence or absence of ECC, a temperature sensor value, a BG dump flag, and the dump destination external storage device are recorded.

The kind of the main memory module indicates a kind of the main memory device. Specifically, the kind of the main memory module indicates that the main memory device is volatile or nonvolatile. FIG. 5 illustrates the EEPROM 211 of the nonvolatile main memory device 131-1, and therefore "nonvolatile" is recorded.

The capacity of the main memory module indicates a capacity of the nonvolatile main memory device 131-1.

The presence or absence of the ECC indicates the presence or absence of an Error Check and Correct (ECC) function of the nonvolatile main memory device 131-1.

The temperature sensor value indicates a temperature of the nonvolatile main memory device 131-1 acquired from a temperature sensor.

The BG dump flag indicates whether or not the BG dump processing is performed. The BG dump flag is set to any of 0 to 2. The BG dump flag indicates that 0 is invalid (namely, that the BG dump processing is not performed, or the BG dump processing is completed), that 1 is valid (namely, that the BG dump processing is performed), and that 2 is valid, and Wait (namely, wait for the BG dump processing).

The dump destination external storage device indicates an external storage device of a dump destination.

Also, on the volatile main memory devices 121, the EEPROM is mounted in which characteristics (a kind of the main memory module, a capacity of the main memory module, the presence or absence of the ECC, the temperature sensor value, or the like) of the volatile main memory devices 121 are recorded.

FIG. 6 is a flowchart of the memory dump processing according to the first embodiment.

First, the OS is assumed to be executed in the information processing apparatus 101.

In step S501, a clash event occurs, namely, a fatal error occurs in the OS of the information processing apparatus 101.

In step S502, the CPU 111 starts the dump processing.

In step S503, the CPU 111 sets the BG dump flags of the nonvolatile main memory devices 131. Specifically, the CPU 111 refers to the BIOS setting information 173 and confirms priority (Pri) of each of the nonvolatile main memory devices 131. The CPU 111 sets to 1 the BG dump flags of the nonvolatile main memory devices 131 that are Pri=High, and sets to 2 the BG dump flags of the nonvolatile main memory devices 131 that are Pri=Low.

In step S504, the NVM controller 201 sets a flag of the storage element management table 203. Specifically, the NVM controller 201 sets the "used area (Dirty)" to "undumped". The NVM controller 201 sets flags other than the "used area (Dirty)" to the "free space".

In step S505, the CPU 111 resets devices (including the CPU 111 and the volatile main memory devices 121) other than the nonvolatile main memory devices 131.

In step S506, the CPU 111 starts up the OS.

Hereinafter, steps S507 to S510 and step S511 are performed in parallel.

In step S507, the NVM controllers 201 of the nonvolatile main memory devices 131 that are Pri=High perform the BG dump processing. Further, details of the BG dump routine processing will be described later.

In step S508, the CPU 111 detects that the BG dump flags are 0 in the EEPROMs 211 of all of the nonvolatile main memory devices 131 that are Pri=High. That is, the CPU 111 detects that the BG dump routine processing has been completed in all of the nonvolatile main memory devices 131 that are Pri=High.

In step S509, the CPU 111 sets to 1 the BG dump flags in the EEPROMs 211 of the nonvolatile main memory devices 131 that are Pri=Low.

In step S510, the NVM controllers 201 of the nonvolatile main memory devices 131 that are Pri=Low perform the BG dump processing. Details of the BG dump routine processing will be described later.

In step S511, each of the NVM controllers 201 performs interrupt dump processing. Further, the interrupt dump processing will be described later.

The CPU 111 reads out and executes the BIOS 172, and thereby each of the above-described steps performed by the CPU 111 is realized.

FIG. 7 is a detailed flowchart of the BG dump processing according to the first embodiment.

FIG. 7 corresponds to step S507 or step S510 of FIG. 6.

In step S521, the NVM controller 201 selects one page to be processed in the following steps S522 to S524 from among unselected pages. For example, the NVM controller 201 selects a page in which a page number is smallest from among the unselected pages. As a result, a page is selected in ascending order of the page number. Hereinafter, the selected page is described as a selection page.

In step S522, the NVM controller 201 refers to the storage element management table 203 and checks whether a flag of the selection page is "undumped". If the flag of the selection page is "undumped", the control proceeds to step S523. If the flag of the selection page is not "undumped", the control proceeds to step S525.

In step S523, the NVM controller 201 copies (transmits) data of the selection page to the external storage device 161. As a result, the data of the selection page is written to the external storage device 161.

In step S524, the NVM controller 201 sets to the "free space" the flag of the selection page of the storage element management table 203.

In step S525, if the unselected page is present, the control returns to step S521. If the unselected page is not present (namely, if a page is not present in which the flag is "undumped"), the control proceeds to step S526.

In step S526, the NVM controller 201 sets to 0 the BG dump flag of the EEPROM 211.

FIG. 8 is a detailed flowchart of the interrupt dump processing according to the first embodiment.

FIG. 8 corresponds to step S511 of FIG. 6.

In step S531, the NVM controller 201 waits for a write request from the OS. If the write request is received from the OS, the control proceeds to step S532. Also, if the BG dump processing ends, the interrupt dump processing ends.

In step S532, the NVM controller 201 refers to the storage element management table 203 and checks whether or not a flag of a page of the write destination according to the write request is "undumped". If the flag of the page of the write destination is "undumped", the control proceeds to step S533. If the flag of the page of the write destination is not "undumped", the control proceeds to step S534.

In step S533, the NVM controller 201 writes data of the write request in the buffer 202, and reports a write completion to the OS (Write Back type). Further, the NVM controller 201 copies (transmits) a page of the write destination of the write request data to the external storage device 161, and sets a flag of the page to the "free space".

In step S534, the NVM controller 201 writes the write request data to a page (storage element 251) of the write destination. Further, the flag of the page to which the data is written is turned to the "used area (Dirty)". Then, the control returns to step S531.

Figure 9:
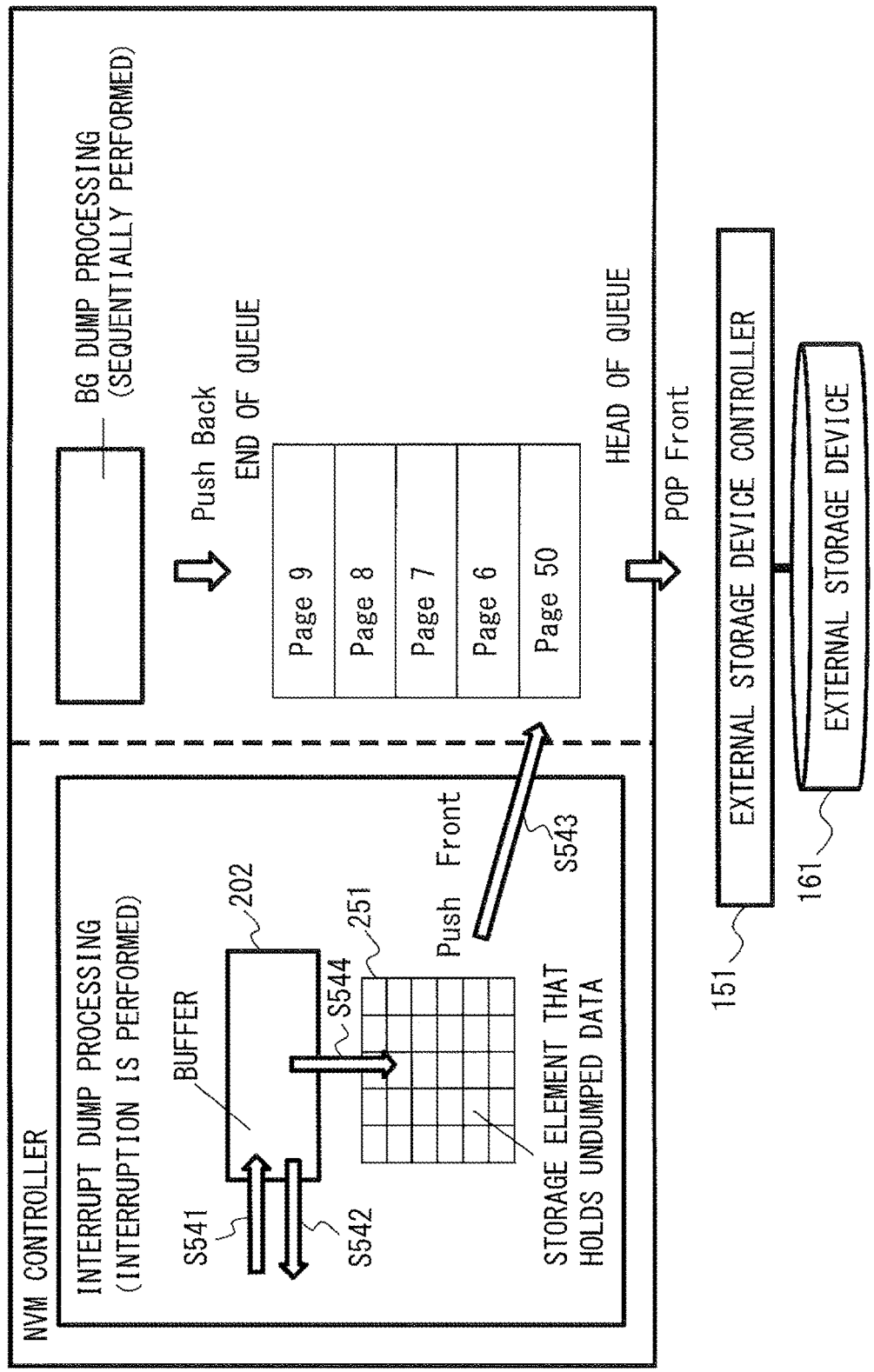
FIG. 9 illustrates the interrupt dump processing according to the first embodiment.

FIG. 9 illustrates the interrupt dump processing according to the first embodiment.

In FIG. 9, the process is illustrated in the case in which the page of the write destination is "undumped".

First, the NVM controller 201 receives the write request from the OS (step S541).

The NVM controller 201 refers to the storage element management table 203 and checks whether or not a flag of a page (page number=50) of the write destination according to the write request is "undumped". Here, since the flag of the page of the write destination is "undumped", the NVM controller 201 writes the write request data to the buffer 202 and reports a write completion to the OS (step S542).

The NVM controller 201 generates a queue for writing the data of the page of the write destination to the external storage device 161, and interrupts the head of queues that have been waiting.

Further, the data of the page of the write destination is written to the external storage device 161, and then the NVM controller 201 writes the write request data to the page (storage element 251) of the write destination.

In FIG. 9, a queue for sequentially dumping pages is generated by the BG dump processing. The generated queues are aligned in the generated order and are sequentially transmitted from the head to the external storage device controller 151.

In FIG. 9, a state is illustrated in which queues for writing pages of page number=6 to 9 to the external storage device 161 are aligned in order, and further a state is illustrated in which a queue for writing a page of page number=50 to the external storage device 161 is interrupted in front of the queue of the page of page number=6. As described above, the queue for writing the page of the page number=50 to the external storage device 161 is inserted into the queues that are aligned, and is performed in advance.

The interrupt dump processing is used, and thereby first data writing from the OS is performed at a low speed; however, in subsequent read-writes to the same page, the same speed is obtained as that of the nonvolatile main memory device during normal times. Further, the interruption occurs in the dump or the dump is performed asynchronously by a plurality of the nonvolatile main memory devices, and thereby fragmentation occurs in a dump file. In a portion in which the dump file becomes discontinuous, a start address and an offset are recorded collectively. As a result, the dump file can be restored to a correct address space when analyzing the dump.

Figure 10:
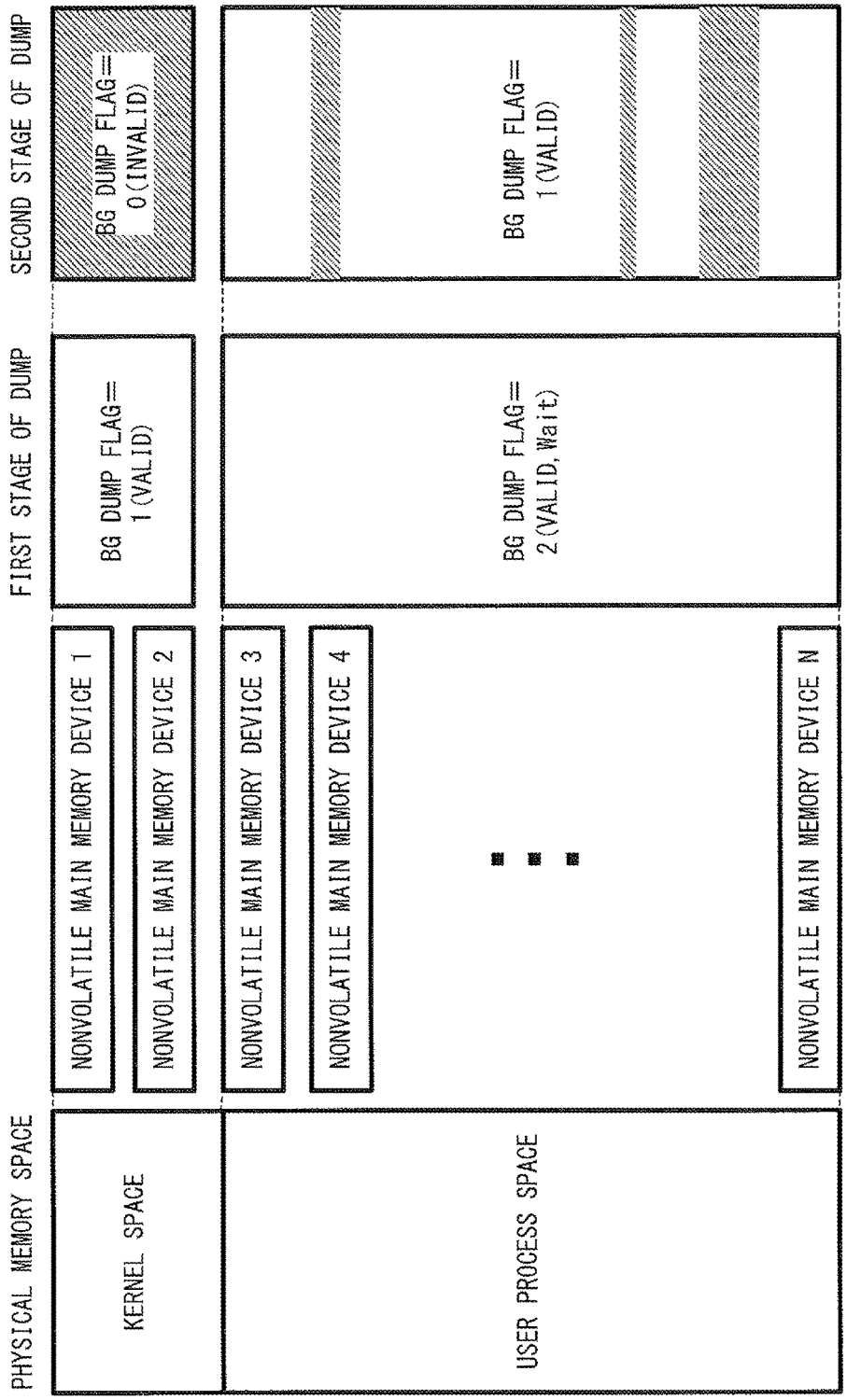
FIG. 10 illustrates a phased memory dump based on priority.

FIG. 10 illustrates a phased memory dump based on the priority.

As described above, in the memory dump processing of FIG. 6, the BG memory dump processing of the nonvolatile main memory devices that are Pri=Low is performed after the BG memory dump processing of the nonvolatile main memory devices that are Pri=High.

A meaning of the above phased BG memory dump processing based on the priority will be described.

From a standpoint of characteristics of the memory management of the OS, a locality of an access sequence or a frequency is expected to be present in a physical memory address determined by the BIOS. To start up the OS, particularly, it is necessary to preferentially dump an area used by a kernel. The above characteristics are held as a profile in the BIOS setting information 173, and prioritization is performed in units of the nonvolatile main memory devices 131. Thereby, it is possible to preferentially dump the area used by the kernel.

Suppose, in FIG. 10, that the nonvolatile main memory devices 1 to N are used, a kernel space is assigned to the nonvolatile main memory devices 1 and 2, and a user process space is assigned to the nonvolatile main memory devices 3 to N.

Therefore, the priority of the nonvolatile main memory devices 1 and 2 is set to High, and the priority of the nonvolatile main memory devices 3 to N is set to Low.

In a first stage of the memory dump, the nonvolatile main memory devices 1 and 2 are set to BG dump flag=1 (valid), and the nonvolatile main memory devices 3 to N are set to BG dump flag=2 (valid: Wait).

When the EEPROM 211 is monitored and the nonvolatile main memory devices 1 and 2 having high priority are set to the BG dump flag=0 (invalid), the CPU 111 that executes the BIOS 172 sets the nonvolatile main memory devices 3 to N having low priority to the BG dump flag=1 (valid) (second stage).

In the case of the BG dump flag=2 (valid: Wait), the NVM controller 201 performs the dump only when the interrupt dump processing is performed in response to the write request from the OS.

In FIG. 10, a portion that is shaded at intervals in the nonvolatile main memory devices 3 to N at the second stage of the dump indicates an area that is previously dumped by the interrupt dump processing.

Figure 11:
FIG. 11 illustrates a state of the storage element management table immediately before a crash event occurs and immediately after a BG dump flag is set according to the first embodiment.

FIG. 11 illustrates a state of the storage element management table immediately before the crash event occurs, and immediately after the BG dump flag is set according to the first embodiment.

The upper side of FIG. 11 illustrates a state of the storage element management table immediately before the crash event occurs, and the lower side of FIG. 11 illustrates a state of the storage element management table immediately after the BG dump flag is set.

In FIG. 11, each record of the storage element management table 203 is arranged and described so as to be associated with a physical position (Column, Row) of the storage element.

In FIG. 11, immediately before the crash event occurs, flags of pages 1 to 3, 6, and X−1 are the "used area (Dirty)", and flags of pages 4, 5, and X are the "free space".

As described in FIG. 6, when the BG dump flag is set (step S503), the NVM controller 201 sets the flags of the storage element management table 203 (step S504). As illustrated in the lower side of FIG. 11, the "used area (Dirty)" is set to "undumped".

According to the information processing apparatus of the first embodiment, it is possible to shorten an operations stoppage time caused by the memory dump processing.

According to the information processing apparatus of the first embodiment, the dump processing from the nonvolatile main memory devices to the external storage device is set to background processing after restarting of the OS, and thereby it is possible to shorten the operations stoppage time.

Second Embodiment

In a second embodiment, the case will be described in which, in the nonvolatile main memory devices 131, storage elements are variably assigned to addresses viewed from the outside.

A configuration of an information processing apparatus of the second embodiment is the same as that of the information processing apparatus of the first embodiment unless otherwise noted, and therefore descriptions will be omitted.

A system that is used in an SSD using a NAND type flash memory and in which the storage elements are variably assigned to addresses viewed from the outside is assumed to be implemented on the nonvolatile main memory devices 131 of the second embodiment.

The above nonvolatile main memory devices 131 perform a process in which data held by a certain storage element cannot be directly updated but is written to another storage element, or a line of a batch of storage elements is erased and then is written again, or the like.

Further, since a life of the storage element depends on the number of times of writing, the nonvolatile main memory devices 131 have a function called wear leveling in which even continuous addresses viewed from the outside are written internally in discontinuous areas so that writing does not lean toward a specified storage element. Therefore, the nonvolatile main memory devices 131 have a table for managing a correspondence between the addresses viewed from the outside and the storage elements. In the second embodiment, the storage element management table 203 of the first embodiment is extended, and thereby a table for managing the correspondence between the addresses viewed from the outside and the storage elements is realized.

In practice, when one address is assigned to one storage element, a large number of management tables are required for the management. Therefore, a correspondence relationship is managed in units of several kilobytes called a block.

Figure 12:
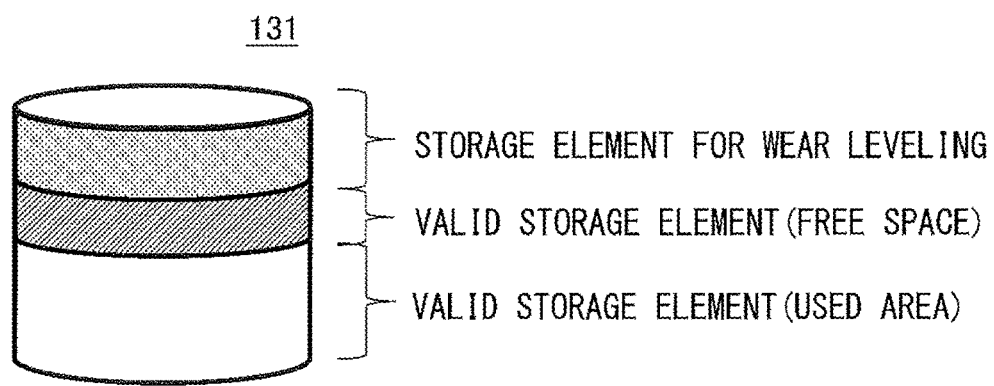
FIG. 12 illustrates a state of the nonvolatile main memory device according to a second embodiment.

FIG. 12 illustrates a state of the nonvolatile main memory device according to the second embodiment.

The nonvolatile main memory devices 131 of the second embodiment have valid storage elements used in a read-write of data and storage elements for wear leveling used for the wear leveling.

As compared to the capacity of the nonvolatile main memory devices 131 viewed from the outside, the nonvolatile main memory devices 131 of the second embodiment in practice have an extra few percent of the storage elements for wear leveling.

In place of the storage element management table 203, the nonvolatile main memory devices 131 of the second embodiment have a storage element management table obtained by extending the storage element management table 203.

Hereinafter, the storage element management table obtained by extending the storage element management table 203 of the first embodiment is described as an extension storage element management table 203'.

Figure 13:
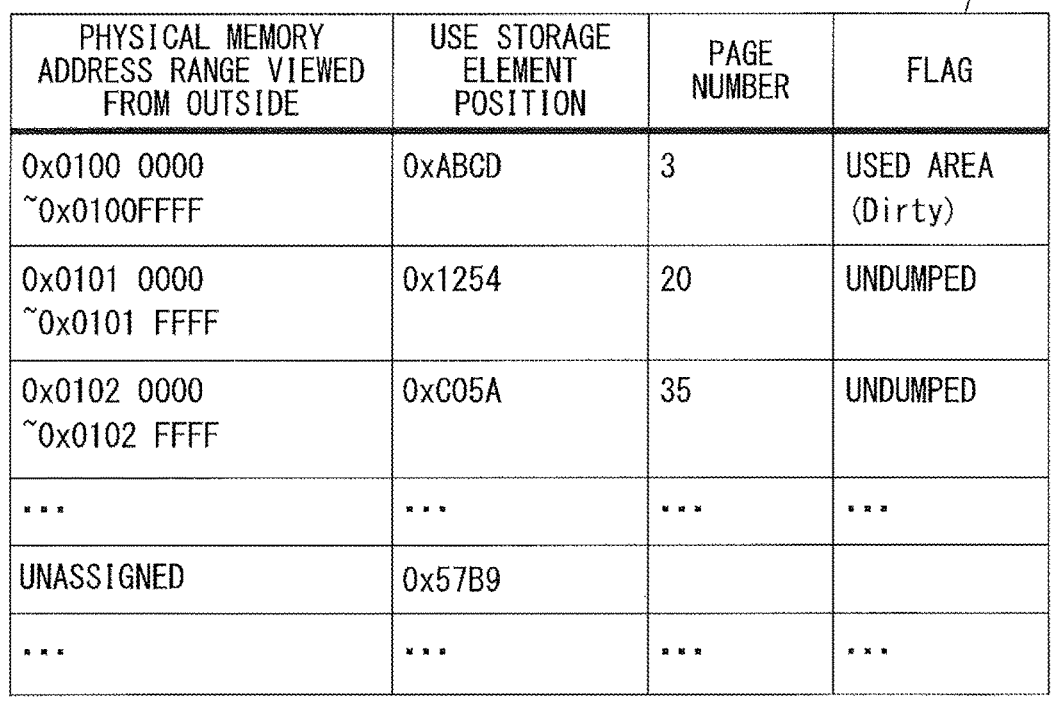
FIG. 13 is an example of an extension storage element management table.

FIG. 13 is an example of the extension storage element management table.

In the extension storage element management table 203', a physical memory address range viewed from the outside, a used storage element position, a page number, and a flag are associated with each other and described.

The physical memory address range viewed from the outside is a physical memory address range of the nonvolatile main memory devices 131 viewed from the outside (the OS or the memory controller 112).

The used storage element position indicates positions of the storage elements 251 of the nonvolatile main memory devices 131.

The page number is a number that is assigned to a page.

The flag is information for indicating a state of a page.

In the second embodiment, memory dump processing and BG dump processing are the same as those of the first embodiment. In the second embodiment, interrupt dump processing to be hereinafter described is performed in place of the interrupt dump processing of FIG. 8.

Figure 14:
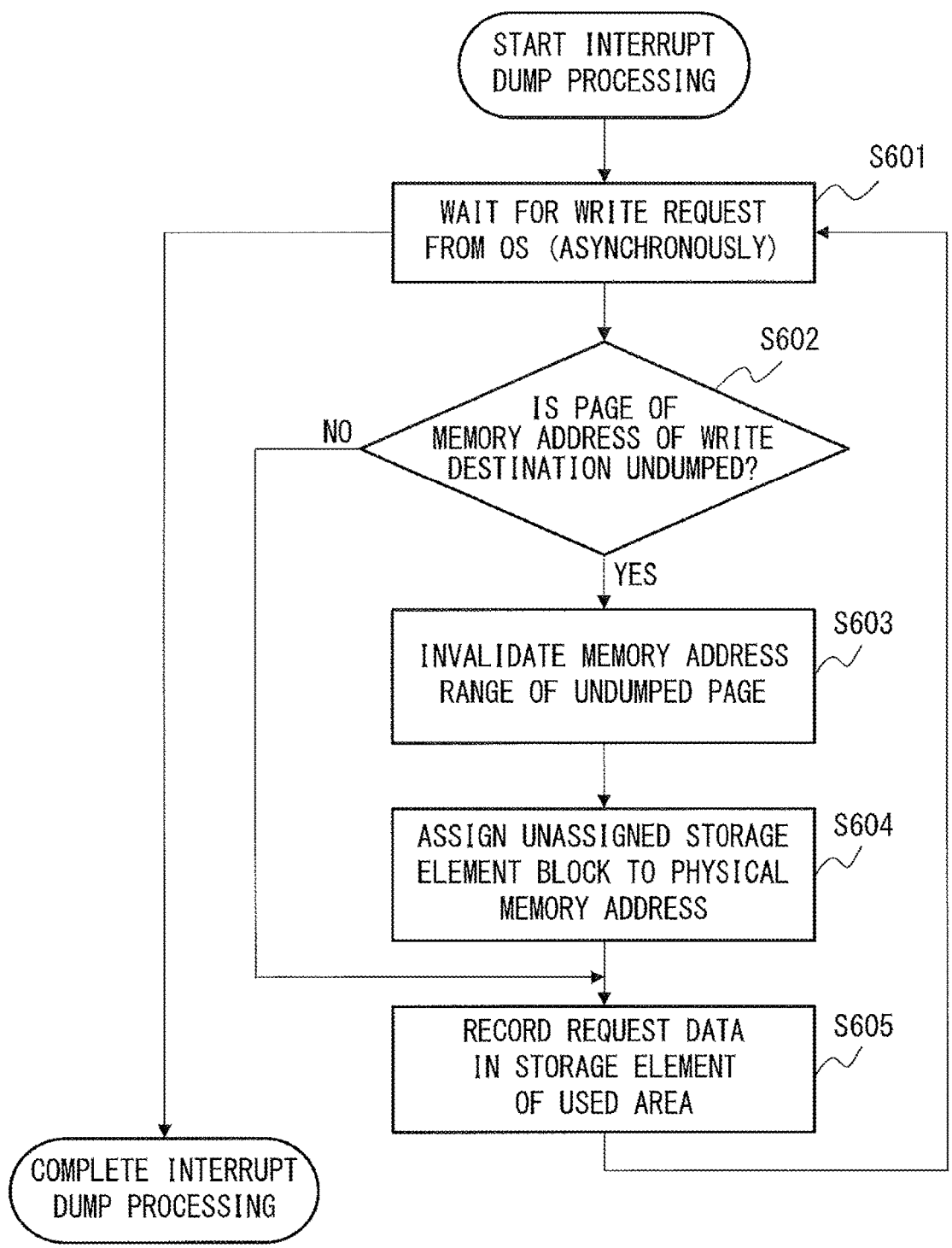
FIG. 14 is a detailed flowchart of interrupt dump processing according to the second embodiment.

FIG. 14 is a detailed flowchart of the interrupt dump processing according to the second embodiment.

FIG. 14 corresponds to step S511 of FIG. 6.

In step S601, the NVM controller 201 waits for the write request from the OS. If the write request is received from the OS, the control proceeds to step S602. Also, if the BG dump processing ends, the interrupt dump processing ends.

In step S602, the NVM controller 201 refers to the extension storage element management table 203' and checks whether or not a flag of a page including a memory address of a write destination is "undumped". If the flag of the page including the memory address of the write destination is "undumped", the control proceeds to step S603. If the flag of the page including the memory address of the write destination is not "undumped", the control proceeds to step S605.

In step S603, the NVM controller 201 invalidates the physical memory address range viewed from the outside, including the memory address of the write destination. Specifically, the NVM controller 201 writes "invalid" in the physical memory address range viewed from the outside, including in the memory address of the write destination of the extension storage element management table 203'.

In step S604, the NVM controller 201 assigns the invalidated physical memory address range viewed from the outside to unassigned storage elements. Specifically, the NVM controller 201 writes the invalidated physical memory address range viewed from the outside and a page number of the invalidated page in the physical memory address range viewed from the outside and the page number corresponding to the used storage element positions of the unassigned storage elements of the extension storage element management table 203', respectively.

In step S605, the NVM controller 201 writes the write request data to a newly assigned page. Further, a flag of the page to which data is written is turned to the "used area (Dirty)". Then, the control returns to step S601.

FIG. 15 illustrates the extension storage element management table before the assignment change and that after the assignment change.

The upper side of FIG. 15 illustrates the extension storage element management table 203' before the change, and the lower side of FIG. 15 illustrates the extension storage element management table 203' after the change.

Before the assignment change, as illustrated in the extension storage element management table 203' of the upper side of FIG. 15, the used storage element position corresponding to the physical memory address range viewed from the outside 0x01010000 to 0x0101FFFF is 0x1254, the page number corresponding to this is 20, and the flag corresponding to this is undumped.

Further, as the unassigned storage element, a storage element is used in which the storage element position is 0x57B9.

In FIG. 15, the memory address of the write destination of the write request is assumed to be included in the range of 0x01010000 to 0x0101FFFF.

As described in FIG. 14, when the flag of the page including the memory address of the write destination is "undumped", the NVM controller 201 writes "invalid" in the physical memory address range viewed from the outside, including in the memory address of the write destination of the extension storage element management table 203'. As a result, as illustrated in the extension storage element management table 203' of the lower side of FIG. 15, the physical memory address range viewed from the outside corresponding to the invalidated page is from 0x01010000 to 0x0101FFFF (invalid).

Further, the NVM controller 201 writes the invalidated physical memory address range viewed from the outside and the page number of the invalidated page in the physical memory address range viewed from the outside and the page number corresponding to the used storage element position of the unassigned storage element of the extension storage element management table 203', respectively. The NVM controller 201 writes the write request data to a newly-assigned page, and the flag is set to the "used area (Dirty)".

Thereby, as illustrated in the extension storage element management table 203' of the lower side of FIG. 15, the physical memory address range viewed from the outside corresponding to the storage element position of 0x57B9 is from 0x01010000 to 0x0101FFFF, the page number corresponding to this is 20, and the flag corresponding to this is the "used area (Dirty)".

Further, the BG dump processing is performed asynchronously with the interrupt dump processing in order, and therefore the address data itself is held so that an original address range can be determined afterward. After the dump, the address range and the page number of the storage element are changed into an unassigned state and are pooled for the wear leveling.

According to the information processing apparatus of the second embodiment, it is possible to shorten the operations stoppage time caused by the memory dump processing.

According to the information processing apparatus of the second embodiment, the write processing from the OS is performed asynchronously with the dump processing. As a result, as compared to the first embodiment, it is unlikely that performance degradation will occur.

Third Embodiment

In a third embodiment, the case in which the NVM controller 201 backs up data of the nonvolatile storage devices 131 to the external storage device 161 during normal times in which the memory dump processing is not performed will be described.

A configuration of an information processing apparatus of the third embodiment is the same as that of the information processing apparatus of the first embodiment unless otherwise noted, and therefore descriptions will be omitted.

In the third embodiment, the "used area (Sync)" is further used as a flag of the storage element management table.

The backup processing during normal times is as follows. The NVM controller 201 of the third embodiment monitors the storage element management table 203 and checks whether or not a page is present in which the flag is the "used area (Dirty)".

When the page is detected in which the flag is the "used area (Dirty)", the NVM controller 201 writes data of the page to the external storage device 161 (Backup).

Further, the NVM controller 201 sets the flag of the page to the "used area (Sync)".

When data is written to a page based on the write request from the OS, the NVM controller 201 sets the flag of the page to the "used area (Dirty)".

The NVM controller 201 always monitors the storage element management table 203 and performs backup so as to reduce the number of pages in which the flag is the "used area (Dirty)".

Further, the memory dump processing of the third embodiment is basically the same as that (FIG. 6) of the first embodiment.

Figure 16:
FIG. 16 illustrates a state of the storage element management table immediately before the crash event occurs and immediately after the BG dump flag is set according to a third embodiment.

FIG. 16 illustrates a state of the storage element management table immediately before the crash event occurs, and immediately after the BG dump flag is set according to the third embodiment.

The upper side of FIG. 16 illustrates a state of the storage element management table immediately before the crash event occurs, and the lower side of FIG. 16 illustrates this immediately after the BG dump flag is set.

In FIG. 16, each record of the storage element management table 203 is arranged and described so as to be associated with a physical position (Column, Row) of the storage element.

In FIG. 16, immediately before the crash event occurs, flags of pages 1 and 6 are the "used area (Dirty)", flags of pages 2, 3, and X−1 are the "used area (Sync)", and flags of pages 4, 5, and X are the "free space".

As described above, the memory dump processing of the third embodiment is the same as that of the first embodiment. When the BG dump flag is set (step S503), the NVM controller 201 sets the flags of the storage element management table 203 (step S504). As illustrated in the lower side of FIG. 16, the "used area (Dirty)" is set to "undumped" and the "used area (Sync)" is set to the "free space".

In the third embodiment, since the pages of the flag=the used area (Sync) are previously backed up to the external storage device 161, it is unnecessary to dump the above pages.

In the third embodiment, when the lower side of FIG. 11 is compared to the lower side of FIG. 16, the number of pages in which the flag is "undumped" is reduced to a greater extent.

Therefore, in the third embodiment, it is possible to shorten a time of the memory dump processing, as compared to the first embodiment.

Figure 17:
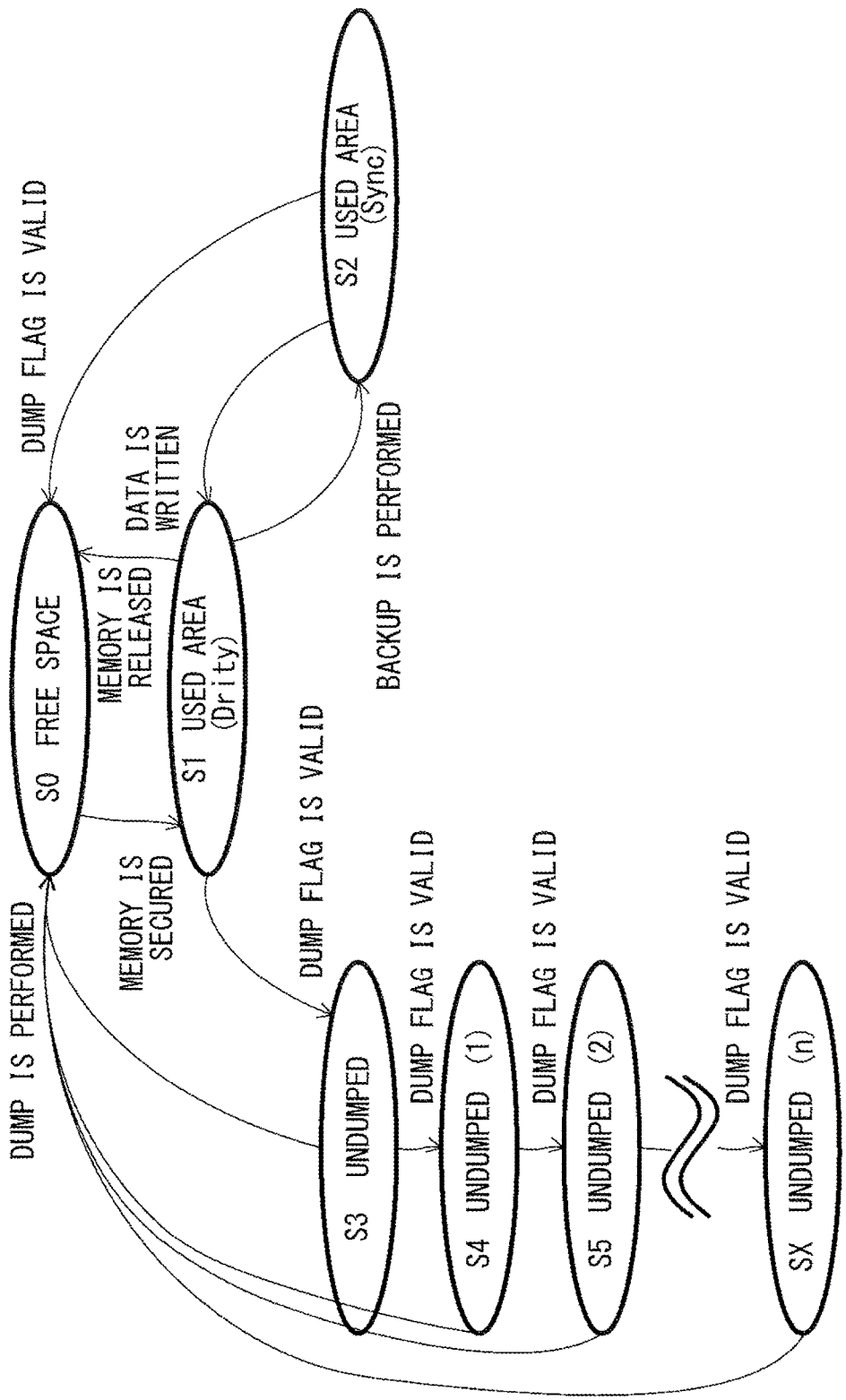
FIG. 17 is a state transition diagram of a flag of the storage element management table.

FIG. 17 is a state transition diagram of the flags of the storage element management table.

In an initial state, S0 (flag=free space) holds.

In the state of S0, when data is written to a page, the state transits to S1 (flag=used area (Dirty)).

In the state of S1, when the backup processing is performed during normal times, the state transits to S2 (flag=used area (Sync)). Further, in the state of S1, when the dump flag becomes valid, the state transits to S3 (flag=undumped). On the other hand, in the state of S1, when the nonvolatile main memory devices 131 including the pages are released (memory release), the state transits to S0 (flag=undumped).

In the state of S2, when data is written to a page, the state transits to S1 (flag=used area (Dirty)). In the state of S2, when the dump flag becomes valid, the state transits to S3 (flag=undumped).

In the state of S3, when the dump flag becomes valid, the state transits to S4 (flag=undumped (1)). In the state of S3, when the memory dump processing is performed, the state transits to S0 (flag=free space).

Hereinafter, similarly, in the state of S4 to S (X−1), when the dump flag becomes valid, the number indicating a generation of "undumped" is incremented by one. However, in the state of SX, the number indicating the generation of "undumped" is not incremented. Further, in the state of S4 to SX, when the memory dump processing is performed, the state transits to S0 (flag=free space).

According to the information processing apparatus of the third embodiment, it is possible to shorten the operations stoppage time caused by the memory dump processing.

According to the information processing apparatus of the third embodiment, since the backup is taken during normal times, it is sufficient to just dump only a difference between data and the backup during the memory dump processing. Therefore, it is possible to shorten a time of the memory dump processing.

Fourth Embodiment

In a fourth embodiment, a case will be described in which a process is performed in which all or a part of the nonvolatile main memory devices are set to be outside of a dump target or a process is performed in which copying or the like is performed from the volatile main memory device to the nonvolatile main memory device, in any of the first to third embodiments.

A configuration of an information processing apparatus of the fourth embodiment is the same as that of the information processing apparatus of the first embodiment unless otherwise noted, and therefore descriptions will be omitted.

Figure 18A:
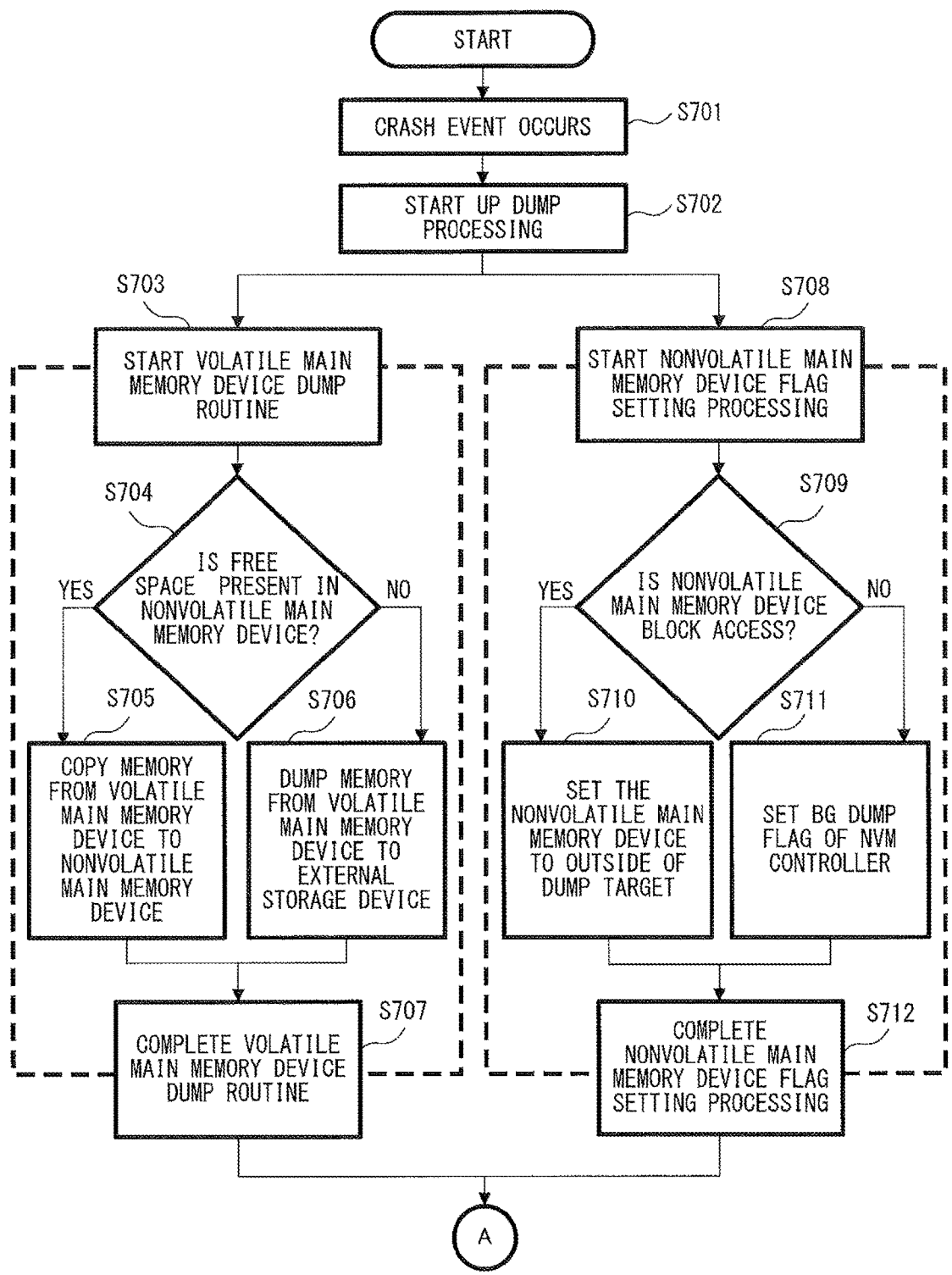
FIG. 18A is a flowchart of memory dump processing according to a fourth embodiment.

FIGS. 18A and 18B are a flowchart of memory dump processing according to the fourth embodiment.

First, in the information processing apparatus 101, the OS is assumed to be executed.

In step S701, a clash event occurs, namely, a fatal error occurs in the OS of the information processing apparatus 101.

In step S702, the CPU 111 starts the dump processing.

Hereinafter, the dump routine processing (steps S703 to S707) of the volatile main memory device and the flag setting processing (steps S708 to S712) of the nonvolatile main memory device are performed in parallel. Further, the dump routine processing of the volatile main memory device and the flag setting processing of the nonvolatile main memory device may be performed in series and either processing may be performed first.

In step S703, the CPU 111 starts the volatile main memory device dump routine processing of the foreground (foreground dump). The foreground indicates a state in which the information processing apparatus 101 exclusively operates for the dump processing and the task is not operated.

Further, the CPU 111 refers to the EEPROMs of the main memory devices (the volatile main memory devices 121 and the nonvolatile main memory devices 131) and determines whether the main memory device is volatile or nonvolatile.

In step S704, the CPU 111 checks whether the free space in which it is possible to copy all data or a portion of data of the volatile main memory devices 121 is present in the nonvolatile main memory devices 131. If the free space in which it is possible to copy the data of the volatile main memory devices 121 is present, the control proceeds to step S705. If the free space in which it is possible to copy the data of the volatile main memory devices 121 is not present, the control proceeds to step S706.

In step S705, the CPU 111 copies (writes) the data of the volatile main memory devices 121 to (in) the nonvolatile main memory devices 131. When the data of the volatile main memory devices 121 is copied to the nonvolatile main memory devices 131, the CPU 111 simultaneously stores additional information (for example, a start address and a size of the copied data, an offset of the start address, or the like) in which an original memory address of the volatile main memory device can be determined afterward.

Further, if the free space of the nonvolatile main memory devices 131 is not present in the course of copying, the control proceeds to step S706. The data which is not previously copied of the volatile main memory devices 121 is copied to the external storage device 161.

In step S706, the CPU 111 copies (writes) the data of the volatile main memory devices 121 to (in) the external storage device 161.

In step S707, the CPU 111 ends the volatile main memory device dump routine processing.

Desirably, the free space of the nonvolatile main memory devices 131 can be implemented so as to be previously reserved, and the volatile main memory device dump routine processing is performed so as to dynamically correspond to the free space that is changed based on a state in which the crash event occurs.

In step S708, the CPU 111 starts the nonvolatile main memory device flag setting processing.

In step S709, the CPU 111 refers to the BIOS setting information 173, and checks whether the nonvolatile main memory devices 131 are a block access type. If the nonvolatile main memory devices 131 are the block access type, the control proceeds to step S710. If the nonvolatile main memory devices 131 are not the block access type (if the nonvolatile main memory devices 131 are a byte access type), the control proceeds to step S711. The above-described check is performed with respect to all of the nonvolatile main memory devices 131.

In step S710, the CPU 111 sets the nonvolatile main memory devices 131 that are the block access type to be outside of the dump target.

In step S711, the CPU 111 sets the BG dump flag of the nonvolatile main memory devices 131 that are the byte access type. Specifically, the CPU 111 refers to the BIOS setting information 173 and confirms priority (Pri) of each of the nonvolatile main memory devices 131. The CPU 111 sets to 1 the BG dump flags of the nonvolatile main memory devices 131 that are Pri=High, and sets to 2 the BG dump flags of the nonvolatile main memory devices 131 that are Pri=Low.

The NVM controller 201 in which the BG dump flag is set sets flags of the storage element management table 203. Specifically, the NVM controller 201 sets the "used area (Dirty)" to "undumped". The NVM controller 201 sets flags other than the "used area (Dirty)" to the "free space".

In step S712, the CPU 111 ends the nonvolatile main memory device flag setting processing.

In step S713, the CPU 111 determines whether the manual exchange of the nonvolatile main memory devices 131 is performed. Specifically, the CPU 111 refers to the BIOS setting information 173 and determines whether the manual exchange of the nonvolatile main memory devices 131 is performed, based on whether the "manual exchange" is YES or NO. If the manual exchange is performed, the control proceeds to step S714. If the manual exchange is not performed, the control proceeds to step S717.

In step S714, the CPU 111 turns off power of the information processing apparatus 101.

Further, the CPU 111 performs an event notification to a Baseboard Management Controller (BMC) that manages the information processing apparatus 101 from the BIOS at the timing of power-off and start-up of the dump processing, respectively. Further, the BMC notifies a maintenance worker of a timing of preparation and starting of the manual exchange by a method such as e-mail or a Simple Network Management Protocol (SNMP) trap.

In step S715, the maintenance worker manually exchanges the nonvolatile main memory devices 131 and turns on a power of the information processing apparatus 101.

The maintenance worker dumps data of the removed nonvolatile main memory device by a computer prepared separately on the spot or at a support center and merges the above data with data dumped to the external storage device 161 to thereby acquire dump data necessary for an analysis.

When data of the nonvolatile main memory devices 131 is encrypted in consideration of security, the maintenance worker acquires decryption codes with a consent of an owner of the information processing apparatus 101.

In step S716, the CPU 111 starts up the OS.

In step S717, the CPU 111 resets the CPU 111 and the volatile main memory devices 121 so that a memory address space of the nonvolatile main memory devices 131 does not disappear.

In step S718, the CPU 111 starts up the OS.

In step S719, the CPU 111 and the NVM controller 201 perform the BG dump processing. In step S719, for example, the process of steps S507 to S510 of FIG. 6 is performed. The BG dump processing is performed by the nonvolatile main memory devices 131 in which the BG dump flag is set in step S711.

In step S720, each of the NVM controllers 201 performs the interrupt dump processing. The interrupt dump processing is as illustrated in FIG. 8 or 14.

Each of the above-described steps performed by the CPU 111 is realized by reading out and performing the BIOS 172 through the CPU 111.

Above-described acquired dump data is files obtained at disorder timing and having disorder addresses, and therefore the dump data is merged by a separately prepared software tool, or dump analysis software capable of reading a discrete file is used.

Figure 19:
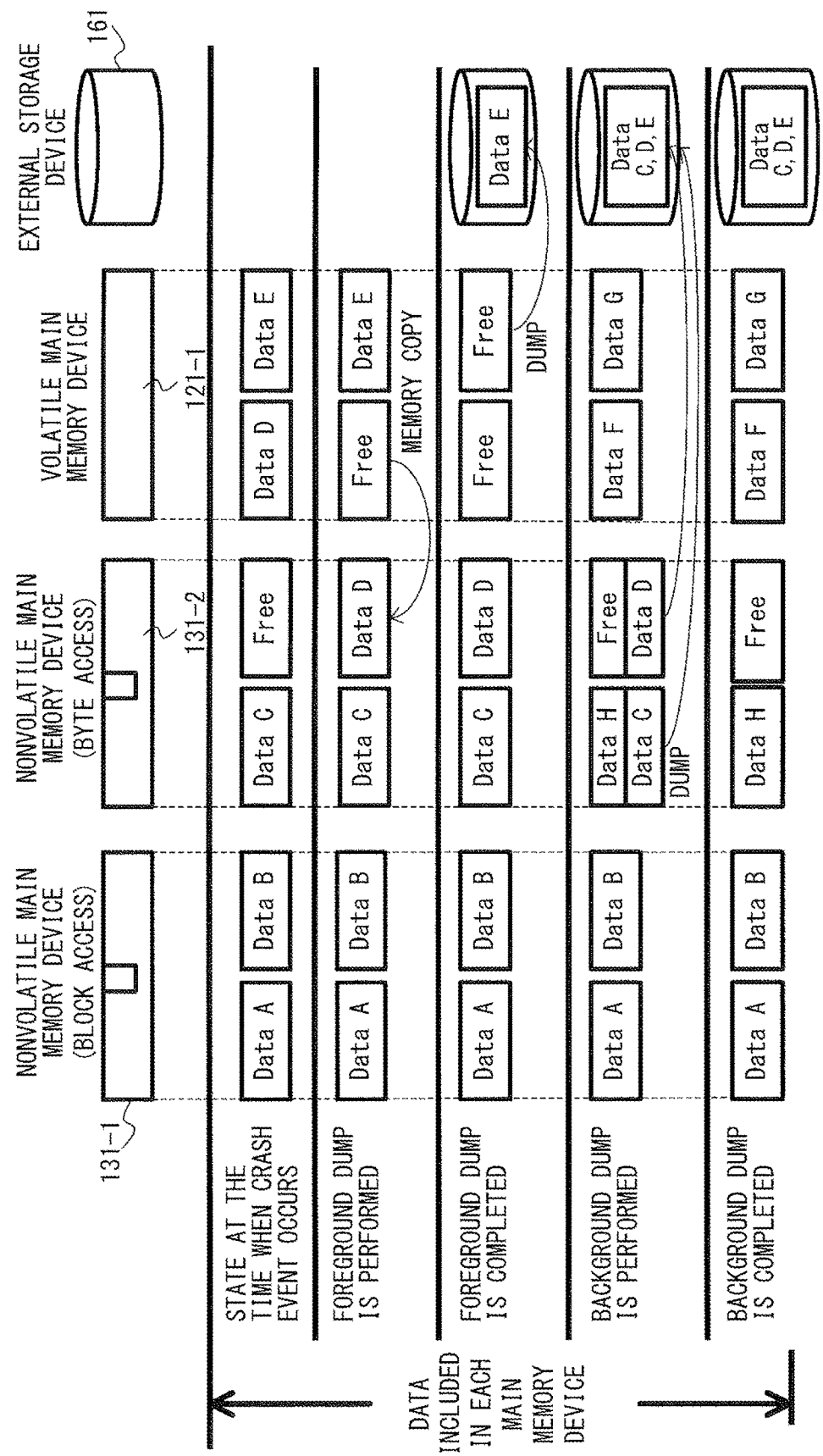
FIG. 19 illustrates positions of data at the time of each processing according to the fourth embodiment.

FIG. 19 illustrates positions of data at the time of each processing according to the fourth embodiment.

In FIG. 19, the nonvolatile main memory device 131-1 is the block access type and the nonvolatile main memory device 131-2 is the byte access type. Further, descriptions of the nonvolatile main memory device 131-3 will be omitted. Further, in FIG. 19, the volatile main memory device 121-1 will be described, and descriptions of the volatile main memory devices 121-2 and 121-3 will be omitted.

First, when the crash event occurs, the nonvolatile main memory device 131-1 stores data A and B. The nonvolatile main memory device 131-2 stores data C, and has a free space (Free). The volatile main memory device 121-1 stores data D and E (the state of FIG. 19 at the time when the crash event occurs). The data A and B of the nonvolatile main memory device 131-1 is held until the background dump is completed.

The volatile main memory device dump routine (foreground dump) is started, and the data D of the volatile main memory device 121-1 is copied to the nonvolatile main memory device 131-2 (during the foreground dump of FIG. 19). Further, the data D is copied to the nonvolatile main memory device 131-2, and thereby the free space of the nonvolatile main memory device 131-2 disappears.

The free space of the nonvolatile main memory device 131-2 is not present, and therefore the data E of the volatile main memory device 121-1 is copied to the external storage device 161 (completion of the foreground dump of FIG. 19).

When the OS is restarted (step S718) and the BG dump processing is performed (step S719), the data C and D of the nonvolatile main memory device 131-2 is copied to the external storage device 161. Further, data F and G of the restarted OS is written to the volatile main memory device 121-1, and data H of the restarted OS is written to the nonvolatile main memory device 131-2 (during the background dump of FIG. 19).

When the BG dump processing ends, the volatile main memory device 121-1 stores the data F and G, the nonvolatile main memory device 131-2 stores the data H, and an area in which the data D is present is turned to the free space (completion of the background dump of FIG. 19).

According to the information processing apparatus of the fourth embodiment, it is possible to shorten the operations stoppage time caused by the memory dump processing.

According to the information processing apparatus of the fourth embodiment, a block access type nonvolatile main memory device does not require the dump, and therefore is controlled so as to be outside of the dump target, thereby eliminating unnecessary processing.

According to the information processing apparatus of the fourth embodiment, data of the volatile main memory device is copied to the free space of the nonvolatile main memory device that is more quickly accessible than the external storage device. As a result, it is possible to shorten a time required for the foreground dump.

According to the information processing apparatus of the fourth embodiment, the dump processing from the nonvolatile main memory device to the external storage device is set to the background processing after the OS is restarted. As a result, it is possible to shorten the operations stoppage time.

Figure 20:
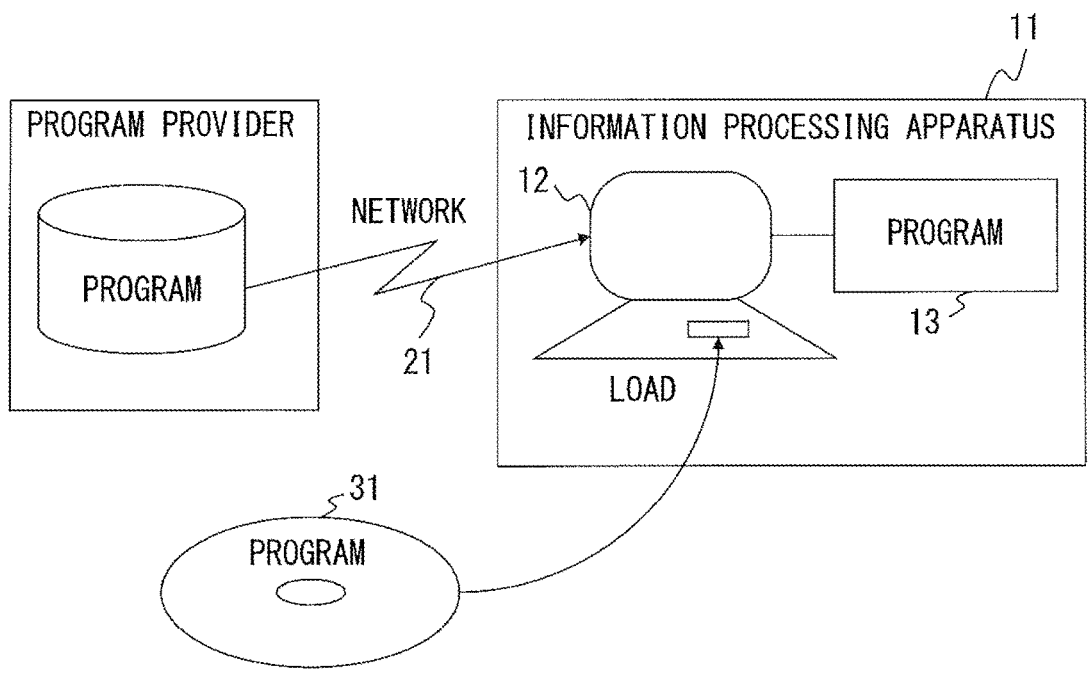
FIG. 20 is a block diagram of a computer system.

FIG. 20 is a block diagram of a computer system.

The above-described memory dump processing can be obviously realized by a general computer system. In FIG. 20, an information processing apparatus 11 for realizing the memory dump processing of the embodiments is configured by a main body 12 and a memory 13. The memory 13 corresponds to the storage devices such as the volatile main memory devices 121, the nonvolatile main memory devices 131, the external storage device 161, and the BIOS storage area 171.

Programs for performing the memory dump processing and the like of each embodiment are stored in the above memory 13, and the programs are executed by the main body 12. As a result, it is possible to realize various processing of the embodiments.

The above programs can be loaded into the information processing apparatus 11 via a network 21 from a program provider side. Further, programs can be stored in a portable-type storage medium 31 that is commercially available and is circulated, and the above portable-type storage medium 31 can be set in the information processing apparatus 11. Further, the program can be read out in the memory 13 and can be executed by the main body 12.

As the portable-type storage medium 31, various types of storage media such as a CD-ROM, a flexible disk, an optical disk, and a magneto-optical disk can be used. A program code itself read out from the above storage media realizes the functions of the embodiments.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a processor that executes an operating system;
a nonvolatile main memory device to which the processor is directly accessible and that has a controller; and
an external storage device to which the processor is not directly accessible and the controller is directly accessible,
when the processor detects an error of the operating system, the processor resets devices other than the nonvolatile main memory device and restarts the operating system, and the controller writes data of the nonvolatile main memory device to the external storage device after restarting the operating system.

2. The information processing apparatus according to claim 1, wherein
the nonvolatile main memory device is provided with a plurality of nonvolatile main memory devices,
the information processing apparatus further comprises an information storage unit that stores setting information in which priority of each nonvolatile main memory device of the plurality of nonvolatile main memory devices is described,
the processor refers to the setting information and, in descending order of priority, causes the controller to perform a process in which the data of the nonvolatile main memory device is written to the external storage device.

3. The information processing apparatus according to claim 1, wherein the controller
receives from the operating system first data that is to be written to the nonvolatile main memory device,
when second data that is present in an area in which the first data is to be written is not written to the external storage device, writes the second data to the external storage device, and
writes the first data to the nonvolatile main memory device after the second data is written to the external storage device.

4. The information processing apparatus according to claim 1, wherein
the nonvolatile main memory device has an unassigned area with respect to an address viewed from outside,
the controller
receives from the operating system the first data that is to be written to the nonvolatile main memory device,
when the second data that is present in the first area in which the first data is to be written is not written to the external storage device,
invalidates the address that is assigned to the first area and is viewed from the outside,
assigns to the unassigned area the address that was assigned to the first area and is viewed from the outside, and
writes the first data to the unassigned area in which the address that was assigned to the first area and is viewed from the outside.

5. The information processing apparatus according to claim 1, wherein the controller
has a management table in which a flag is described indicating whether each piece of data of a plurality of areas of the nonvolatile main memory device was previously written to the external storage device,
when the operating system operates, refers to the management table and detects unwritten data that is not written to the external storage device is detected,
writes the unwritten data to the external storage device, and
sets a flag corresponding to the written data to indicate that the data was previously written to the external storage device.

6. The information processing apparatus according to claim 5, wherein
when the processor detects an error of the operating system,
the controller refers to the management table and writes, based on the flag, to the external storage device only data of the nonvolatile main memory device that is not written to the external storage device.

7. The information processing apparatus according to claim 1, further comprising an information storage unit that stores setting information indicating whether the nonvolatile main memory device is a dump target, wherein
the nonvolatile main memory device further includes a main memory device information storage unit that stores a dump flag indicating whether a process is to be performed in which the data of the nonvolatile main memory device is written to the external storage device,
the processor sets to be valid, based on the setting information, the dump flag of the nonvolatile main memory device that is a dump target, and
when the dump flag is valid, the controller writes the data of the nonvolatile main memory device to the external storage device.

8. The information processing apparatus according to claim 1, further comprising a volatile main memory device to which the processor is directly accessible, wherein before the data of the nonvolatile main memory device is written to the external storage device, the controller writes data of the volatile main memory device to the nonvolatile main memory device.

9. A memory dump method performed by an information processing device including a processor that executes an operating system, a nonvolatile main memory device, and an external storage device, the memory dump method comprising:
detecting, by the processor, an error of the operating system;
resetting, by the processor, devices other than the nonvolatile main memory device;
restarting, by the processor, the operating system; and
writing, by a controller included in the nonvolatile main memory device to which the processor is directly accessible, data of the nonvolatile main memory device to the external storage device after restarting the operating system,
the nonvolatile main memory device is directly accessible from the processor, and
the external storage device is not directly accessible from the processor and is directly accessible from the controller.

10. A non-transitory computer-readable storage medium storing a memory dump program for causing a computer including a processor that executes an operating system, a nonvolatile main memory device, and an external storage device, to execute a process, the process comprising:

detecting, by the processor, an error of the operating system;

resetting, by the processor, devices other than the nonvolatile main memory device;

restarting, by the processor, the operating system; and writing, by a controller included in the nonvolatile main memory device to which the processor is directly accessible, data of the nonvolatile main memory device to the external storage device after restarting the operating system, the nonvolatile main memory device is directly accessible from the processor, and the external storage device is not directly accessible from the processor and is directly accessible from the controller.

* * * * *